US011173334B2

(12) United States Patent
Xie et al.

(10) Patent No.: US 11,173,334 B2
(45) Date of Patent: Nov. 16, 2021

(54) POLYORGANOSILOXANE COMPOUNDS AS ACTIVE INGREDIENTS IN FLUORINE FREE FIRE SUPPRESSION FOAMS

(71) Applicant: TYCO FIRE PRODUCTS LP, Lansdale, PA (US)

(72) Inventors: Yuan Xie, Marinette, WI (US); Amy J. Wirth, Menominee, MI (US); Philip J. Karjala, Marinette, WI (US)

(73) Assignee: Tyco Fire Products LP, Lansdale, PA (US)

( * ) Notice: Subject to any disclaimer, the term of this patent is extended or adjusted under 35 U.S.C. 154(b) by 2 days.

(21) Appl. No.: 16/086,216

(22) PCT Filed: Mar. 16, 2017

(86) PCT No.: PCT/US2017/022770
§ 371 (c)(1),
(2) Date: Sep. 18, 2018

(87) PCT Pub. No.: WO2017/161156
PCT Pub. Date: Sep. 21, 2017

(65) Prior Publication Data
US 2020/0164241 A1 May 28, 2020

(51) Int. Cl.
*A62D 1/02* (2006.01)
*C08G 77/452* (2006.01)
*C08G 77/392* (2006.01)

(52) U.S. Cl.
CPC ......... *A62D 1/0071* (2013.01); *C08G 77/392* (2013.01); *C08G 77/452* (2013.01)

(58) Field of Classification Search
CPC ... A62D 1/0071; C08G 77/392; C08G 77/452
See application file for complete search history.

(56) References Cited

U.S. PATENT DOCUMENTS

| | | | |
|---|---|---|---|
| 3,047,619 A | 7/1962 | Brace | |
| 3,257,407 A | 6/1966 | Brace | |
| 3,258,423 A | 6/1966 | Tuve et al. | |
| 3,457,172 A | 7/1969 | Stewart et al. | |
| 3,562,156 A | 2/1971 | Francen | |
| 3,579,446 A | 5/1971 | Kroke et al. | |
| 3,621,059 A | 11/1971 | Lee | |
| 3,621,917 A | 11/1971 | Rosen et al. | |
| 3,655,555 A | 4/1972 | Rossmy et al. | |
| 3,661,776 A | 5/1972 | Fletcher et al. | |
| 3,677,347 A | 7/1972 | Rosen et al. | |
| 3,759,981 A | 9/1973 | Hager et al. | |
| 3,772,195 A | 11/1973 | Francen | |
| 3,772,199 A | 11/1973 | Tamai et al. | |
| 3,789,265 A | 1/1974 | Holz et al. | |
| 3,828,085 A | 8/1974 | Price et al. | |
| 3,839,425 A | 10/1974 | Bartlett et al. | |
| 3,849,315 A | 11/1974 | Chiesa, Jr. | |
| 3,923,649 A | 12/1975 | Sparham et al. | |
| 3,941,708 A | 3/1976 | Gentit et al. | |
| 3,952,075 A | 4/1976 | Nakamura et al. | |
| 3,957,657 A | 5/1976 | Chiesa, Jr. | |
| 3,957,658 A | 5/1976 | Chiesa et al. | |
| 3,963,776 A | 6/1976 | Middleton | |
| 4,038,198 A | 7/1977 | Wagner et al. | |
| 4,042,522 A | 8/1977 | Falk | |
| 4,049,556 A | 9/1977 | Tujimoto et al. | |
| 4,060,132 A | 11/1977 | Chiesa, Jr. | |
| 4,060,489 A | 11/1977 | Chiesa, Jr. | |
| 4,069,158 A | 1/1978 | Bertocchio et al. | |
| 4,090,976 A | 5/1978 | Dehollander et al. | |
| 4,099,574 A | 7/1978 | Cooper et al. | |
| 4,149,599 A | 4/1979 | Chiesa, Jr. | |
| 4,203,850 A | 5/1980 | Wirtz et al. | |
| 4,209,407 A | 6/1980 | Schuierer et al. | |
| 4,357,473 A | 11/1982 | Knollmueller | |
| 4,387,032 A | 6/1983 | Chiesa, Jr. | |
| 4,536,298 A | 8/1985 | Kamei et al. | |
| 4,795,590 A | 1/1989 | Kent et al. | |
| 5,085,786 A | 2/1992 | Alm et al. | |
| 5,207,932 A | 5/1993 | Norman et al. | |
| 5,218,021 A | 6/1993 | Clark et al. | |
| 5,391,721 A | 2/1995 | Hanen et al. | |
| 5,616,273 A | 4/1997 | Clark et al. | |
| 5,750,043 A | 5/1998 | Clark | |
| 5,820,776 A | 10/1998 | Hansen et al. | |
| 5,935,587 A | 8/1999 | Cauwet et al. | |
| 6,204,208 B1 | 3/2001 | Krzysik et al. | |
| 6,221,922 B1 | 4/2001 | Policello et al. | |
| 6,231,778 B1 | 5/2001 | Hansen | |
| 6,436,306 B1 | 8/2002 | Jennings | |
| 6,599,872 B1 | 7/2003 | Hubert et al. | |
| 7,381,696 B2 | 6/2008 | Hubert et al. | |
| 7,507,775 B2 | 3/2009 | Leatherman et al. | |
| 7,842,647 B2 | 11/2010 | Long | |
| 7,964,032 B2 | 6/2011 | Rajaraman et al. | |
| 8,298,436 B2 | 10/2012 | Michael | |
| 8,334,251 B2 | 12/2012 | Morrison et al. | |
| 8,431,036 B2 | 4/2013 | Mulligan et al. | |
| 8,524,104 B1 | 9/2013 | Michael | |
| 8,946,486 B2 | 2/2015 | Martin | |
| 9,446,272 B2 | 9/2016 | Blunk et al. | |
| 9,669,246 B2 | 6/2017 | Bowen et al. | |
| 9,687,686 B2 | 6/2017 | Blunk et al. | |
| 9,950,978 B2 | 4/2018 | Martin | |
| 9,956,447 B2 | 5/2018 | Martin et al. | |
| 9,956,448 B2 | 5/2018 | Martin | |

(Continued)

FOREIGN PATENT DOCUMENTS

DE 10036532 2/2002
WO WO-2012/045080 A1 4/2012

(Continued)

OTHER PUBLICATIONS

BASF Corporation the Chemical Company, Tinopal NFW Liquid: Formulation Additives Technical Data Sheet, Aug. 2010, pp. 1-3.

(Continued)

*Primary Examiner* — Andrew J. Oyer
(74) *Attorney, Agent, or Firm* — Foley & Lardner LLP

(57) ABSTRACT

Novel polyorganosiloxane compounds are disclosed that are useful in firefighting foams. Methods of making and using the polyorganosiloxane compounds and foams are also described.

39 Claims, No Drawings

(56) References Cited

U.S. PATENT DOCUMENTS

| | | |
|---|---|---|
| 10,046,191 B1 | 8/2018 | Hernandez et al. |
| 10,173,089 B2 | 1/2019 | Xie |
| 10,780,305 B2 | 9/2020 | Xie et al. |
| 10,829,718 B2 | 11/2020 | Bauer et al. |
| 2003/0001129 A1 | 1/2003 | Hubert et al. |
| 2008/0128141 A1 | 6/2008 | Murata et al. |
| 2009/0156073 A1 | 6/2009 | Schubert |
| 2010/0002787 A1 | 1/2010 | Choi et al. |
| 2010/0178512 A1 | 7/2010 | Giesenberg et al. |
| 2010/0278716 A1 | 11/2010 | Sudo et al. |
| 2011/0240309 A1 | 10/2011 | Kingma et al. |
| 2012/0251750 A1 | 10/2012 | Sybert et al. |
| 2013/0055335 A1 | 2/2013 | Chien |
| 2013/0092865 A1 | 4/2013 | Carlson et al. |
| 2013/0277597 A1 | 10/2013 | Bowen et al. |
| 2014/0127523 A1* | 5/2014 | Delis .................... C08G 63/695 428/541 |
| 2014/0234629 A1 | 8/2014 | Sun et al. |
| 2016/0023032 A1 | 1/2016 | Bowen |
| 2016/0030790 A1 | 2/2016 | Libal et al. |
| 2016/0038778 A1 | 2/2016 | Siem |
| 2016/0038779 A1 | 2/2016 | Bowen et al. |
| 2017/0182341 A1 | 6/2017 | Libal |
| 2018/0345061 A1 | 12/2018 | Hernandez et al. |
| 2019/0112549 A1 | 4/2019 | Bauer et al. |
| 2019/0240520 A1 | 8/2019 | Libal |

FOREIGN PATENT DOCUMENTS

| | | |
|---|---|---|
| WO | WO 2013/055335 A1 | 4/2013 |
| WO | WO-2014/153122 | 9/2014 |
| WO | WO-2014/153140 A1 | 9/2014 |
| WO | WO 2017/161156 A1 | 9/2017 |
| WO | WO-2017/161162 A1 | 9/2017 |
| WO | WO-2017/189703 | 11/2017 |

OTHER PUBLICATIONS

International Search Report for PCT/US2017/022770, dated Aug. 14, 2017.

English language abstract from EP-1 980 611-A2 (Oct. 15, 2008)—Evonik Goldschmidt Gmbh [DE].

Hetzer et al., "Fire Testing a New Fluorine-free AFFF Based on a Novel Class of Environmentally Sound High Performance Siloxane Surfactants," Fire Safety Science-Proceedings of the Eleventh International Symposium, 2014, http://iafss.org/publications/fss/11/1261/view/fss_11-1261.pdf, pp. 1261-1270.

Hetzer et al., "Siloxane-Based AFFF: Testing of Experimental Foam Concentrates," Conference: Suppression, Detection and Signaling Research and Applications Symposium at San Antonio, Texas, Mar. 2016, https://www.nfpa.org/~/media/Files/News-and-Research/Resources/Research-Foundation/Symposia/2016-SUPDET/2016-Papers/SUPDET2016Hetzer.ashx?la=en, 10 pages.

Wang, Peng, "Application of Green Surfactants Developing Environment Friendly Foam Extinguishing Agent," Fire Technology, Jul. 2014, 9 pages.

* cited by examiner

POLYORGANOSILOXANE COMPOUNDS AS ACTIVE INGREDIENTS IN FLUORINE FREE FIRE SUPPRESSION FOAMS

CROSS REFERENCE TO RELATED APPLICATIONS

This application is a 371 national phase of PCT/US2017/022770, filed Mar. 16, 2017, which claims the benefit of the filing date of U.S. Provisional Patent Application No. 62/310,499, filed Mar. 18, 2016, the disclosures of which are incorporated, in their entirety, by this reference.

BACKGROUND

Technical Field

The invention described herein relates to novel organosiloxane and polyorganosiloxane compounds and methods of making and using the compounds. These compounds are useful in fire foam compositions as drop in additives or as a replacement for traditional fluorosurfactants.

Background Information

Conventional firefighting foams are prepared by aerating or trapping air within a concentrated foaming composition. These foams are typically prepared from concentrates by diluting with water and aerating the mixture to form a foam. The foams are then dispensed onto a fire forming a thick, foam blanket that suffocates and extinguishes a fire by reducing oxygen availability.

An important class of firefighting foams includes aqueous, film-forming foams (AFFFs). An important characteristic of these firefighting foams is stability over an extended period of time and burn back resistance. Conventional foams include fluorinated and perfluorinated surfactants such as perfluorooctanesulphonate (PFOS), perfluorooctanoic acid (PFOA) and fluorotelomer-based foams. These surfactants exhibit low surface tension, high foaming and spreading abilities, and demonstrate good burn back resistance due to the presence of fluoro groups. The negative environmental impact of foams including perfluorochemicals, however, has been recognized resulting in restricted use or a complete ban of foams containing perfluorochemicals in some countries.

The environmental impact of foams including perfluorochemicals results from the long half-life of these chemicals in the environment. Chemicals such as PFOS are resistant to hydrolysis, photolysis, microbial degradation, and vertebrate metabolism. For example, PFOS and PFOA have been shown to accumulate in water and reduce oxygen supply to aquatic life. These chemicals may also accumulate in the liver of mammals and result in acute toxicity.

The shorter chain, non-perfluorinated surfactants such as fluorotelomers present similar environmental problems because they contain perfluorinated chemical moieties. For example, $C_6$ fluorotelomers break down to perfluorohexanoic acid, which has been shown to also have negative environmental effects similar to the longer PFOA and PFOS perfluorochemicals. In addition, the manufacturing process of these shorter fluorotelomers results in the production of fluorotelomer alcohols that are significant sources of other environmentally damaging perfluorocarbons.

Thus, there is a recognized need for new fluorine-free firefighting foams which minimize impact to the environment while still presenting excellent foaming, stability and spreading ability in addition to burn back resistance.

Organosilicon based additives for use in firefighting foams have been contemplated, but the manufacturing of these silicon containing compounds is complex requires multiple steps and at an increased expense. These aspects have limited their use in firefighting foams. In addition, other silicon based compounds that have been contemplated for use in fire foams are bulky branched structures, which have limited effectiveness in lowering the surface tension of the foaming agents and promoting foam stability and spreading; see for example, U.S. Pat. No. 3,929,649.

BRIEF SUMMARY

In one embodiment, polyorganosiloxane containing compounds of Formula II are disclosed:

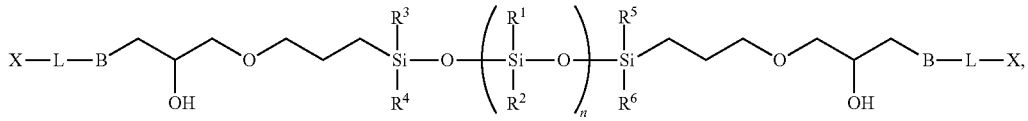

where n is from 1-20; $R^1$, $R^2$, $R^3$, $R^4$, $R^5$, and $R^6$ are each independently $C_{1-3}$ alkyl; B is selected from S, O, and —N($R^7$)—, where $R^7$ is selected from H and $C_q2_{q+1}$, where q is an integer from 1 to 3; L is selected from $C_1$-$C_6$ alkylene, $C_5$-$C_6$ cycloalkylene, and benzyl; and X is selected from —$CO_2H$, —$CO_2M$, —$SO_3H$, —$SO_3M$, and —$NH_4T$, where M is a countercation and T is a counteranion.

In another embodiment, polyorganosiloxane containing compounds of Formula II are disclosed where X is $SO_3M$; M is $Na^+$; L is a $C_2$ alkylene; and B is —N($R^7$)—, where q is 1. In one embodiment, these compounds are of Formula III:

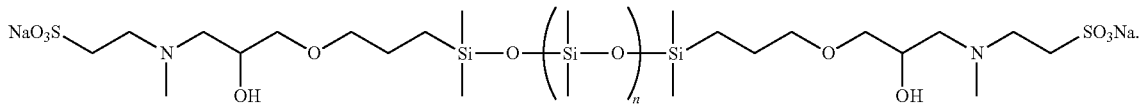

In another embodiment, polyorganosiloxane containing compounds of Formula IV are disclosed:

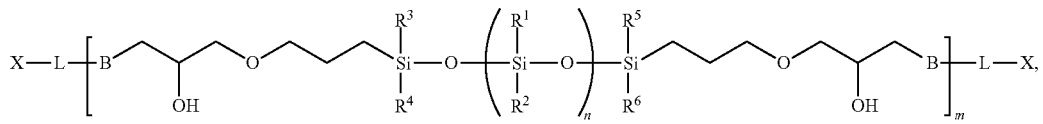

where n is from 1-20; m is from 1 to 1,000,000; $R^1$, $R^2$, $R^3$, $R^4$, $R^5$, and $R^6$ are each independently $C_{1-3}$ alkyl; B is —NH—CH(CH$_3$)(CH$_2$)—O—(CH$_2$CH$_2$—O)$_p$—(CH$_2$)(CH$_3$)CH—NH—, where p is an integer from 2 to 40; L is selected from $C_1$-$C_{12}$ alkylene, —CH$_2$CH(OH)CH$_2$—; and X is selected from —CO$_2$H, —CO$_2$M, —SO$_3$H, —SO$_3$M, and —NH$_4$T, where M is a countercation and T is a counteranion. In some embodiments, p is an integer from 10 to 20.

In another embodiment, polyorganosiloxane containing compounds of Formula IV are disclosed where L is —CH$_2$CH(OH)CH$_2$—; X is SO$_3$M; and M is Na$^+$. In one embodiment, these compounds are of Formula V:

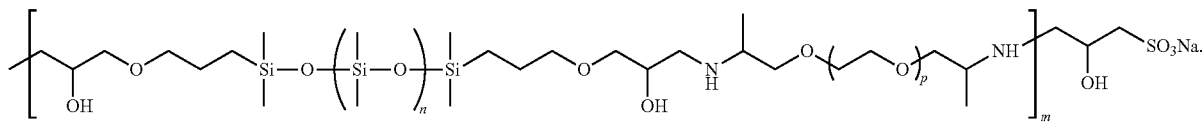

In another embodiment, polyorganosiloxane containing compounds of Formula VI are disclosed:

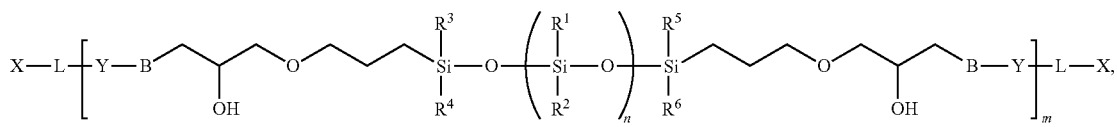

where n is from 1-20; m is from 1 to 1,000; $R^1$, $R^2$, $R^3$, $R^4$, $R^5$, and $R^6$ are each independently $C_{1-3}$ alkyl; B is selected from a secondary amine and a tertiary amine; Y is a linear or branched polyethylenimine; L is selected from $C_1$-$C_{12}$ alkylene and —CH$_2$CH(OH)CH$_2$—; and X is selected from —CO$_2$H, —CO$_2$M, —SO$_3$H, —SO$_3$M, and —NH$_4$T, where M is a countercation and T is a counteranion. In some embodiments, the polyethylenimine includes a molecular weight of from about 1,000 to about 10,000. In some embodiments, the polyethylenimine includes about 25% tertiary amine. In some embodiments, the polyethylenimine includes about 50% secondary amine. In some embodiments, the polyethylenimine includes about 25% primary amine. In some embodiments, the polyethylenimine is of Formula VIII:

$$NH_2-(CH_2CH_2N)_x-(CH_2CH_2NH)_y- \\ | \\ CH_2CH_2NH_2 ,$$

where a ratio of y to x is 2:1 and the polyethylenimine has a number average molecular weight selected from 1,200 g/mol, 1,800 g/mol, and 10,000 g/mol.

In another embodiment, polyorganosiloxane containing compounds of Formula IV are disclosed where X is SO$_3$M; M is Na$^+$; and L is —CH$_2$CH(OH)CH$_2$—. In one embodiment, these compounds are of Formula VII:

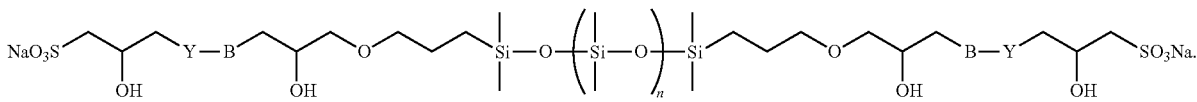

In some embodiments, $R^1$, $R^2$, $R^3$, $R^4$, $R^5$ and $R^6$ of Formulas I, IV, and VI are the same. In some embodiments $R^1$, $R^2$, $R^3$, $R^4$, $R^5$, and $R^6$ of Formulas I, IV, and VI are different. In some embodiments $R^1$, $R^2$, $R^3$, $R^4$, $R^5$ and $R^6$ of Formulas I, IV, and VI are methyl. In some embodiments, n of Formulas I, IV, and VI is an integer from 5 to 15.

In some embodiments, the counteranion of Formulas I, IV, and VI is a halide selected from Cl$^-$, Br$^-$, and I$^-$. In some embodiments, the countercation of Formulas I, IV, and VI is selected from Na$^+$ and K$^+$.

In some embodiments, the polyorganosiloxane compounds of Formulas II-VII have a hydrophilic lipophilic balance of from 2 to 20.

In some embodiments, the polyorganosiloxane compounds of Formulas II-VII have a polydispersity index of about 2 to about 20.

In some embodiments, the polyorganosiloxane compounds of Formulas II-VII have a weight average molecular weight of about 750 g/mol to about 500,000 g/mol.

In some embodiments, the polyorganosiloxane compounds of Formulas II-VII have a number average molecular weight of about 750 g/mol to about 500,000 g/mol.

In one aspect, a method of making the polyorganosiloxane compound of Formula II includes: (a) providing a diglycidyl ether terminated polyorganosiloxane of Formula IX:

Another embodiment is a firefighting foam composition including a polyorganosiloxane compound of Formulas II-VII. In some embodiments, the polyorganosiloxane compound promotes a spreading and a stabilization of the firefighting foam. In some embodiments, the polyorganosiloxane compound includes about 0.01% to about 25% of the foam composition In some embodiments, the firefighting foam further includes one or more surfactants, one or more solvents, one or more electrolytes, one or more foam stabilizers, one or more film formers, one or more corrosion inhibitors, or one or more antimicrobials.

In some embodiments, the firefighting foam composition includes one or more surfactants including a non-ionic surfactant, a zwitterionic surfactant, or an anionic surfactant, or a combination thereof.

In some embodiments, the firefighting foam composition includes one or more surfactants including a non-ionic surfactant selected from polyoxyethylene derivatives of alkylphenols, linear or branched alcohols, fatty acids, alkylamines, alkylamides, and acetylenic glycols, alkyl glycosides and alkyl polyglycosides.

In some embodiments, the firefighting foam composition includes one or more surfactants including a zwitterionic surfactant selected from amine oxides, aminopropionates, sultaines, sulfobetaines, alkyl sulfobetaines, alkyl betaines,

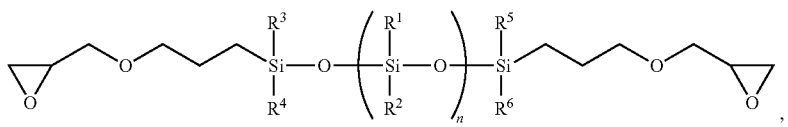

and (b) adding to a reaction mixture including the diglycidyl ether terminated polyorganosilicon compound a reactant NH(CH$_3$)CH$_2$CH$_2$X, where n and X is as described for Formulas II, IV, and VI.

Another aspect is a method of making the polyorganosiloxane compound of Formula IV including: (a) providing a diglycidyl ether terminated polyorganosiloxane of Formula IX; (b) adding to a reaction mixture including the diglycidyl ether terminated polyorganosiloxane a first reactant CH$_3$CH(NH$_2$)CH$_2$—O—(CH$_2$CH$_2$—O)$_p$—CH$_2$(NH$_2$)CHCH$_3$; and (c) adding a second reactant LCH$_2$CH(OH)CH$_2$X to the reaction mixture, where n and X is as described for Formulas II, IV, and VI and L is a leaving group selected from Cl$^-$, Br$^-$, and I$^-$.

Another aspect is a method of making the polyorganosiloxane compound according of Formula VI including: (a) providing a diglycidyl ether terminated polyorganosiloxane of Formula IX; (b) adding to a reaction mixture including the diglycidyl ether terminated polyorganosiloxane a first reactant selected as a linear or branched polyethyleneimine; and (c) adding a second reactant LCH$_2$CH(OH)CH$_2$X, where n and X is as described for Formulas II, IV, and VI and L is a leaving group selected from Cl$^-$, Br$^-$, and I$^-$. In some embodiments, the polyethylenimine is of Formula VIII:

alkylamidobetaines, dihydroxyethyl glycinates, imadazoline acetates, imidazoline propionates, and imidazoline sulfonates.

In some embodiments, the firefighting foam composition includes one or more surfactants including an anionic surfactant selected from alkyl carboxylates and alkyl sulfates.

In some embodiments, the firefighting foam composition includes one or more solvents selected from hexylene glycol, butyl carbitol, butyl cellulose, polyethylene glycol, methyl diproxitol, propylene glycol, propylene glycol n-propyl ether, and tripropylene glycol methyl ether.

In some embodiments, the firefighting foam composition includes one or more stabilizers selected from ethylene glycol monoalkyl ethers, polyethylene glycol, diethylene glycol monoalkyl ethers, propylene glycol, dipropylene glycol monoalkyl ethers, triethylene glycol monoalkyl ethers, 1-butoxyethoxy-2-propanol, glycerine, hexylene glycol, and trimethylglycine.

In some embodiments, the firefighting foam is selected from a low-expansion foam, a medium expansion foam, and a high-expansion foam.

Another embodiment is a method of extinguishing a fire including administering to a fire, a firefighting foam composition described herein. In some embodiments, the fire is a class A fire, a class B fire, a class C fire, or a class K fire.

DETAILED DESCRIPTION

The following paragraphs define in more detail the embodiments of the invention described herein. The following embodiments are not meant to limit the invention or narrow the scope thereof, as it will be readily apparent to one of ordinary skill in the art that suitable modifications and adaptations may be made without departing from the scope of the invention, embodiments, or specific aspects described

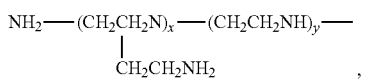

where a ratio of y to x is 2:1 and the polyethylenimine has a number average molecular weight selected from 1,200 g/mol, 1,800 g/mol, and 10,000 g/mol.

herein. All patents and publications cited herein are incorporated by reference herein in their entirety.

For purposes of interpreting this specification, the following terms and definitions will apply and whenever appropriate, terms used in the singular will also include the plural and vice versa. In the event that any definition set forth below conflicts with any document incorporated herein by reference, the definition set forth below shall control.

The term "alkyl" as used herein alone or as part of another group, refers to a straight or branched chain hydrocarbon containing from 1 to 10, 20, or 30 or more carbon atoms. As used herein, the denotation $C_n$-$C_{n+m}$ refers to the number of carbons as a straight or branched alkyl chain, where n and m are integers greater than 1. Representative examples of alkyl include, but are not limited to, methyl, ethyl, n-propyl, iso-propyl, n-butyl, sec-butyl, iso-butyl, tert-butyl, n-pentyl, iso-pentyl, neopentyl, n-hexyl, 3-methylhexyl, 2,2-dimethylpentyl, 2,3-dimethylpentyl, n-heptyl, n-octyl, n-nonyl, n-decyl, and the like. In some embodiments, alkyl may be straight chained. In some embodiments, alkyl may be branched.

The term "alkoxy" as used herein alone or as part of another group, refers to an alkyl group, as defined herein (and thus including substituted versions such as polyalkoxy), appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like. In some aspects, alkoxy groups, when part of a more complex molecule, include an alkoxy substituent attached to an alkyl via an ether linkage.

The term "cyclic" "cycloalkyl" as used herein alone or as part of another group, refers to a saturated or partially unsaturated cyclic hydrocarbon group containing from 3, 4 or 5 to 6, 7 or 8 carbons (which carbons may be replaced in a heterocyclic group as discussed below). Representative examples of cycloalkyl include cyclopropyl, cyclobutyl, cyclopentyl, cyclohexyl, cycloheptyl, and cyclooctyl. The term "cycloalkyl" is generic and intended to include heterocyclic groups as discussed below unless specified otherwise.

The term "aryl" or "aromatic" as used herein alone or as part of another group, refers to a monocyclic carbocyclic ring system or a bicyclic carbocyclic fused ring system having one or more aromatic rings. Representative examples of aryl include benzyl, azulenyl, indanyl, indenyl, naphthyl, phenyl, tetrahydronaphthyl, and the like. The term "aryl" or "aromatic" is intended to include both substituted and unsubstituted aryl or aromatic unless otherwise indicated.

The term "heterocyclic" as used herein alone or as part of another group, refers to an aliphatic (e.g., fully or partially saturated heterocyclic) or aromatic (e.g., heteroaryl) monocyclic- or bicyclic-ring system. Monocyclic ring systems are exemplified by any 3, 4, 5 or 6 membered ring containing 1, 2, 3, or 4 heteroatoms (i.e., other than a carbon atom) independently selected from oxygen, nitrogen and sulfur. The 5 membered ring has from 0-2 double bonds and the 6 membered ring has from 0-3 double bonds. The term "heterocyclic" as used herein, therefore, also encompasses heteroaromatic and heteroaryl groups.

The term "leaving group" as used herein refers to any molecular fragment, which leaves with a loan pair of electrons.

The term "halo" or "halogen" as used herein refers to any suitable halogen, including —F, —Cl, —Br, and —I.

The term "amine" as used herein refers to a —N(R$^1$)(R$^2$) radical, where R$^1$ and R$^2$ may each independently be hydrogen or a suitable substituent, such as an alkyl group. The term primary amine refers to a —NH$_2$ radical; a secondary amine refers to a —NH(R$^1$) radical; and a tertiary amine refers to a —N(R$^1$)(R$^2$) radical where R$^1$ and R$^2$ are each independently alkyl.

The term "number average molecular weight" or "$M_n$" refers to the statistical average molecular weight of all molecules in the sample expressed in units of g/mol. The number average molecular weight may be determined by techniques known in the art, such as gel permeation chromatography (where $M_n$ can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation, $$M_n = \frac{\sum N_i M_i}{\sum N_i}$$

where $M_i$ is the molecular weight of a molecule and $N_i$ is the number of molecules of that molecular weight.

The term "weight average molecular weight" or "$M_w$" refers to the statistical average molecular weight of all molecules, taking into account the weight of each molecule in determining its contribution to the molecular weight average, expressed in units of g/mol. The higher the molecular weight of a given molecule, the more that molecule will contribute to the $M_w$ value. The weight average molecular weight may be calculated by techniques known in the art which are sensitive to molecular size, such as static light scattering, small angle neutron scattering, X-ray scattering, and sedimentation velocity. The weight average molecular weight is defined by the equation, $$M_w = \frac{\sum N_i M_i^2}{\sum N_i M_i}$$

where '$M_i$' is the molecular weight of a molecule and is the number of molecules of that molecular weight.

The term "polydispersity index" or "PDI" refers to the breadth of the molecular weight distribution of a population of molecules. The polydispersity index is defined by the equation, $$PDI = \frac{M_w}{M_n}$$

where 'PDI' is the ratio of the weight average molecular weight '$M_w$' as described herein to the number average molecular weight '$M_n$' as described herein. All molecules in a population of molecules that is monodisperse have the same molecular weight and that population of molecules has a PDI or $M_w/M_n$ ratio equal to 1.

As used herein, the term "HLB" refers to the hydrophilic-lipophilic balance of the polymers described herein. The HLB may be calculated by the equation $$HLB = 20 * M_h/M$$

where '$M_n$' is the molecular mass of the hydrophilic portion of the polymer and 'M' is the molecular mass of the entire molecule. The scale ranges from 0 to 20, with a value of 0 corresponding to a complete lipophilic/hydrophobic molecule and a value of 20 corresponding to a completely hydrophilic/lipophobic molecule.

As used herein, the term "foam" or "firefighting foam" refers to a stable mass of low-density, air-filled bubbles. The density of these bubbles is lower than the solvent being coated with the foam, and thus, remains on top of the solvent to which the foam is being dispensed. As further described herein, the foams form a homogenous blanket for extinguishing a fire.

As used herein, the term "concentrate" or "foam concentrate" refers to a liquid concentrated solution, which when mixed with water at a specified ratio as described further herein forms a foam solution.

As used herein, the term "drainage" refers to the foam solution spreading over a liquid or fuel being coated. The drainage rate of a firefighting foam is the time it takes for the expanded foam mass to spread over the fuel or solvent on which the foam is dispensed.

As used herein, the term "expansion rate" or "expansion rate ratio" refers to the volume of expanded foam divided by the volume of foam concentrate used to create the expanded foam. For example, an expansion rate ratio of 5 to 1 indicates that for example, one litre of foam solution after aeration would fill an empty five-litre container with the expanded foam mass.

As used herein, the term "class A fire" refers to ordinary solid combustibles. Examples of combustible materials include paper and wood. The term "class B fire" refers to flammable liquids and gases. Examples of such combustible materials include combustible liquids, petrol, grease, and oil. The term "class C fire" refers to energized electrical equipment fires. The term "class D fire" refers to combustible metal fires. The term "class K fire" refers to kitchen fires. Examples of combustible kitchen fire fuels include cooking oils, grease, and animal fat.

Described herein are novel organosiloxane and polyorganosiloxane containing compounds. As further described herein, these compounds are well suited for drop in use in existing or new firefighting foam compositions. These compounds when used in firefighting foams demonstrate excellent foaming, spreading ability, and burn back resistance.

Thus, as described herein, these organosiloxane and polyorganosiloxane compounds may be used as a replacement for perfluorochemicals and perfluorosurfactants conventionally used in firefighting foams. These compounds are amphiphilic and demonstrate a low surface tension. Additional benefits of the silicon compounds described herein are (a) one step conversion reaction for synthesis, (b) a high conversion rate with a high yield requiring little to no purification steps, and (c) little to no halide content present in the final product. Without being bound by any theory, it is believed that these compounds have these beneficial characteristics due to their linear structure, amphiphilic nature, and the presence of a poly(alkylsiloxane) moiety.

In one embodiment, polyorganosiloxane compounds containing a linear poly(alkylsiloxane) moeity of Formula I are disclosed:

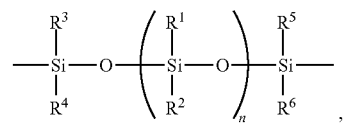

where $R^1$, $R^2$, $R^3$, $R^4$, $R^5$, and $R^6$ are each independently an alkyl group and n is an integer greater than or equal to 1. In some embodiments the alkyl group is a $C_{1-3}$ alkyl. In some embodiments, $R^1$, $R^2$, $R^3$, $R^4$, $R^5$, and $R^6$ are different. In some embodiments, $R^1$, $R^2$, $R^3$, $R^4$, $R^5$, and $R^6$ are the same. In some embodiments, $R^1$, $R^2$, $R^3$, $R^4$, $R^5$, and $R^6$ are methyl. In some embodiments, n is an integer from 1-20. In some embodiments, n is an integer from 5-15 In some embodiments, n is an integer selected from 1, 2, 3, 4, 5, 6, 7, 8, 9, 10, 11, 12, 13, 14, 15, 16, 17, 18, 19, and 20.

In another embodiment, polyorganosiloxane containing compounds of Formula II are disclosed:

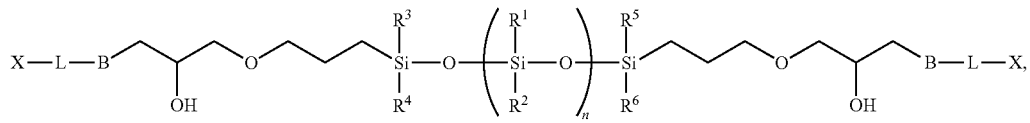

where n, $R^1$, $R^2$, $R^3$, $R^4$, $R^5$, and $R^6$, are described as for Formula I above;
B is selected from S, O, and —N($R^1$)—, where $R^7$ is selected from H and $C_q2_{q+1}$, where
q is an integer from 1 to 3;
L is selected from $C_1$-$C_6$ alkylene, $C_5$-$C_6$ cycloalkylene, and benzyl; and
X is selected from —$CO_2H$, —$CO_2M$, —$SO_3H$, —$SO_3M$, and —$NH_4T$, where M is a countercation and T is a counteranion. In some embodiments, M is a countercation selected from $Na^+$ and $K^+$. In some embodiments, T is a countercation selected from $Cl^-$, $Br^-$, and $I^-$.

In another embodiment, polyorganosiloxane containing compounds of Formula II are disclosed, where X is $SO_3M$; M is $Na^+$; L is a $C_2$ alkylene; and B is —N($R^7$)—, where q is 1. These polyorganosiloxane containing compounds have a structure according to Formula III:

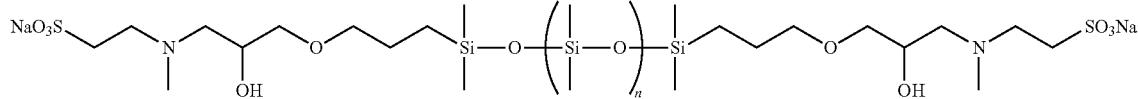

where n is described as for Formulas I and II above.

In another embodiment, polyorganosiloxane containing compounds of Formula IV are disclosed:

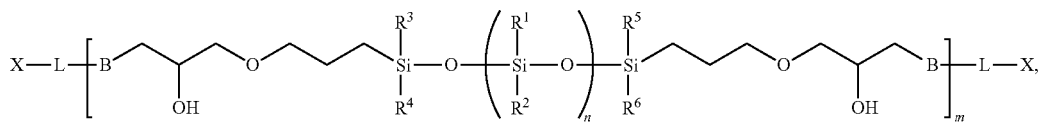

where n, $R^2$, $R^3$, $R^4$, $R^5$, $R^6$, and X are described as for Formulas II and III above; m is an integer from 1 to 1,000,000;
B is —NH—CH(CH$_3$)(CH$_2$)—O—(CH$_2$CH$_2$—O)$_p$—(CH$_2$)(CH$_3$)CH—NH—, where p is an integer from 2 to 40; and
L is selected from $C_1$-$C_{12}$ alkylene and —CH$_2$CH(OH)CH$_2$—.

In another embodiment, polyorganosiloxane containing compounds of Formula IV are disclosed, where L is —CH$_2$CH(OH)CH$_2$—; X is SO$_3$M; and M is Na$^+$. These polyorganosiloxane containing compounds have a structure according to Formula V:

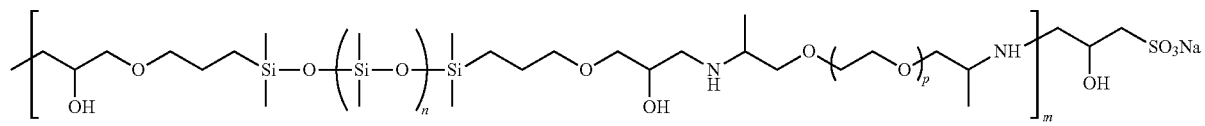

where n, m, and p are as described for Formula IV.

In another embodiment, polyorganosiloxane containing compounds of Formula VI are disclosed:

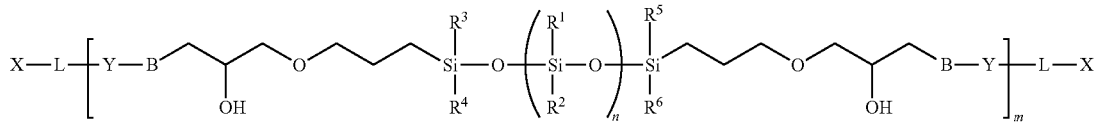

where n, $R^2$, $R^3$, $R^4$, $R^5$, $R^6$, and X are described as for Formulas IV and V;
m is an integer from 1 to 1,000;
B is selected from a secondary amine and a tertiary amine;
Y is a linear or branched polyethylenimine; and
L is selected from $C_1$-$C_{12}$ alkylene and —CH$_2$CH(OH)CH$_2$—.

In another embodiment, polyorganosiloxane containing compounds of Formula VI are disclosed, where X is SO$_3$M; M is Na$^+$; and L is —CH$_2$CH(OH)CH$_2$—. These polyorganosiloxane containing compounds have a structure according to Formula VII:

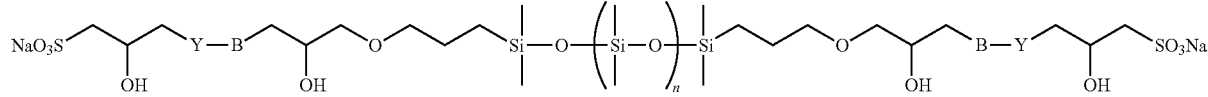

where n is as described in Formulas I-VI above.

In some embodiments described herein, the polyethylenimine is of Formula VIII:

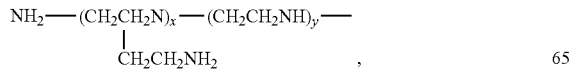

where y and x are each an integer greater than 1.

In some embodiments, the ratio of y to x in the polyethylenimine of Formula VIII is from about 1:5 to about 5:1. In some embodiments, the ratio of y to x is from about 1:1 to about 2:1.

In some embodiments, the polyethylenimine of Formula VIII has a number average molecular weight from about 1,000 g/mol to about 10,000 g/mol. In some embodiments the polyethylenimine has a number average molecular weight of about 1,000 g/mol, about 2,000 g/mol, about 3,000 g/mol, about 4,000 g/mol, about 5,000 g/mol, about 6,000 g/mol, about 7,000 g/mol, about 8,000 g/mol, about 9,000 g/mol, or about 10,000 g/mol. In some embodiments, the polyethylenimine has a number average molecular weight selected from 1,200 g/mol, 1,800 g/mol, and 10,000 g/mol.

In some embodiments, the polyorganosiloxane containing compounds have a number average molecular weight ($M_n$) of about 750 g/mol to about 500,000 g/mol, including each integer within the specified range.

In some embodiments, the polyorganosiloxane containing compounds have a weight average molecular weight ($M_w$) of about 750 g/mol to about 500,000 g/mol, including each integer within the specified range.

In some embodiments, polyorganosiloxane containing compounds have a HLB value of from about 0 to about 20. In some embodiments, the polyorganosiloxane containing compounds have an HLB value of less than 10. In some embodiments, the polyorganosiloxane containing compounds have an HLB value of greater than 10. In some embodiments, the polyorganosiloxane containing compounds have an HLB value of between 3 and 6. In some embodiments, the polyorganosiloxane containing compounds have an HLB value of between 7 and 9. In some embodiments, the polyorganosiloxane containing compounds have an HLB value of between 13 and 15. In some embodiments, the polyorganosiloxane containing compounds have an HLB value of between 12 and 16. In some embodiments, the polyorganosiloxane containing compounds have an HLB value of between 15 and 18.

In some embodiments, the polyorganosiloxane containing compounds have a polydispersity index (PDI) of about 1 to about 20. In some embodiments, the polyorganosiloxane containing compounds have a polydispersity index of about 1 to about 10. In some embodiments, the polyorganosiloxane containing compounds have a polydispersity index of about 1 to about 5. In some embodiments, the polyorganosiloxane containing compounds have a polydispersity index of about 1 to about 2. In some embodiments, the polyorganosiloxane containing compounds have a polydispersity index of about 1 to about 1.5. In some embodiments, the polyorganosiloxane containing compounds have a polydispersity index of about 1 to about 1.25. In some embodiments, the polyorganosiloxane containing compounds have a polydispersity index of about 1 to about 1.1. In some embodiments, the polyorganosiloxane containing compounds have a polydispersity index of about 1. In some embodiments, the polyorganosiloxane containing compounds have a polydispersity index of less than about 1.05, less than about 1.1, less than about 1.15, less than about 1.2, less than about 1.25, less than about 1.5, less than about 1.75, less than about 2, less than about 2.25, less than about 2.5, less than about 2.75, less than about 3, less than about 3.5, less than about 4, less than about 4.5, less than about 5, less than about 6, less than about 7, less than about 8, less than about 9, less than about 10, less than about 11, less than about 12, less than about 13, less than about 14, less than about 15, less than about 16, less than about 17, less than about 18, less than about 19, or less than about 20.

Methods of Manufacturing Polyorganosiloxane Containing Compounds

In one aspect, methods of making a polyorganosiloxane containing compound of Formula II are disclosed. In some embodiments, the method includes (a) providing a diglycidyl ether terminated polyorganosiloxane of Formula IX:

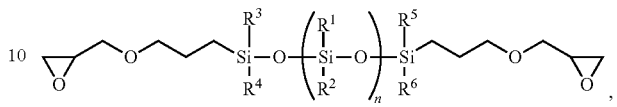

where n, $R^1$, $R^2$, $R^3$, $R^4$, $R^5$, and $R^6$ are as described for Formula I above; (b) adding to a reaction mixture including the diglycidyl ether terminated polyorganosiloxane a reactant $NH(CH_3)CH_2CH_2X$, where X is selected from $-CO_2H$, $-CO_2M$, $-SO_3H$, $-SO_3M$, and $-NH_4T$, where M is a countercation and T is a counteranion. In some embodiments, M is a countercation selected from $Na^+$ and $K^+$. In some embodiments, T is a countercation selected from $Cl^-$, $Br^-$, and $I^-$. In some embodiments, the method further includes isolating the synthesized polyorganosiloxane containing compound. In some embodiments, $R^1$, $R^2$, $R^3$, $R^4$, $R^5$, and $R^6$ are each methyl. In some embodiments the polyorganosiloxane of Formula IX is poly(dimethylsiloxane) diglycidyl ether terminated. In some embodiments, the reactant $NH(CH_3)CH_2CH_2X$ is n-methyltaurine.

In another aspect, methods of making a polyorganosiloxane containing compound of Formula IV are disclosed. In some embodiments, the method includes (a) providing a diglycidyl ether terminated polyorganosiloxane of Formula IX:

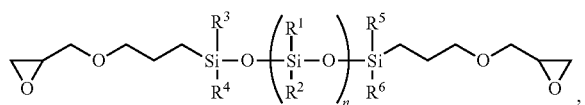

where n, $R^1$, $R^2$, $R^3$, $R^4$, $R^5$, and $R^6$ are as described for Formula I above; (b) adding to a reaction mixture including the diglycidyl ether terminated polyorganosiloxane a first reactant $CH_3CH(NH_2)CH_2-O-(CH_2CH_2-O)_p-CH_2(NH_2)CHCH_3$ (o,o'-bis-(2-aminopropyl)polypropylene glycol-block-polyethylene glycol-block-polypropylene glycol), where p is an integer from 2 to 40; (c) adding a second reactant $LCH_2CH(OH)CH_2X$ to the reaction mixture, where X is selected from $-CO_2H$, $-CO_2M$, $-SO_3H$, $-SO_3M$, and $-NH_4T$, where M is a countercation and T is a counteranion. In some embodiments, M is a countercation selected from $Na^+$ and $K^+$. In some embodiments, T is a countercation selected from $Cl^-$, $Br^-$, and $I^-$; and L is a leaving group selected from $Cl^-$, $Br^-$, and $I^-$. In some embodiments, the method further includes isolating the synthesized polyorganosiloxane containing compound. In some embodiments, $R^1$, $R^2$, $R^3$, $R^4$, $R^5$, and $R^6$ are each methyl. In some embodiments the polyorganosiloxane of Formula IX is poly(dimethylsiloxane) diglycidyl ether terminated. In some embodiments, the reactant $LCH_2CH(OH)CH_2X$ is 3-chloro-2-hydroxy-1-propanesulfonic acid, sodium salt hydrate.

In another aspect, methods of making a polyorganosiloxane containing compound of Formula IX are disclosed. In some embodiments, the method includes (a) providing a diglycidyl ether terminated polyorganosiloxane of Formula IX:

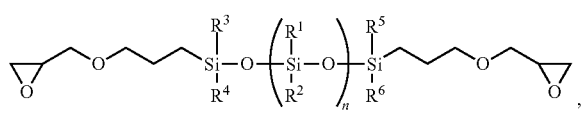

where n, $R^1$, $R^2$, $R^3$, $R^4$, $R^5$, and $R^6$ are as described for Formula I above; adding to a reaction mixture including the diglycidyl ether terminated polyorganosiloxane a first reactant selected as a linear or branched polyethyleneimine (e.g., of Formula VIII described above); (c) adding a second reactant $LCH_2CH(OH)CH_2X$ to the reaction mixture, where X is selected from $-CO_2H$, $-CO_2M$, $-SO_3H$, $-SO_3M$, and $-NH_4T$, where M is a countercation and T is a counteranion. In some embodiments, M is a countercation selected from $Na^+$ and $K^+$. In some embodiments, T is a countercation selected from $Cl^-$, $Br^-$, and $I^-$. In some embodiments, the method further includes isolating the synthesized polyorganosiloxane containing compound. In some embodiments, $R^1$, $R^2$, $R^3$, $R^4$, $R^5$, and $R^6$ are each methyl. In some embodiments, the polyorganosiloxane of Formula IX is poly(dimethylsiloxane) diglycidyl ether terminated. In some embodiments, the reactant $LCH_2CH(OH)CH_2X$ is 3-chloro-2-hydroxy-1-propanesulfonic acid, sodium salt hydrate.

Polymers according to Formula IX are available commercially and may be synthesized by synthetic methods known in the art. For example, poly(dimethylsiloxane), diglycidyl ether terminated, (CAS #130167-23-6) is available from Sigma-Aldrich. Alternatively, the polyorganosiloxane compounds of Formula IX may be synthesized by polyorganosiloxane synthesis methods known in the art, see, for example, Jones, R. G.; Andō Wataru; Chojnowski, J. *Silicon-Containing Polymers: the Science and Technology of Their Synthesis and Applications*; Kluwer Academic Publishers: Dordrecht, 2000, which is incorporated by reference herein for its teachings of polyorganosiloxane synthesis methods.

The method of making the polyorganosiloxane containing compounds of Formulas II, IV, and VI may be carried out in any suitable reaction vessel known in the art such as, for example, a round bottom flask. The reaction may be carried out in an aqueous solution with a suitable evaporative solvent, such as a secondary alcohol (e.g., iso-propanol). The reaction may be carried out under conditions of heat with agitation. In some embodiments, the reaction conditions are carried out at a temperature of about 50° C. to about 75° C. for a period of time ranging from about 2 hours to about 24 hours. The final product may be isolated by a purification method known in the art. For example, the polyorganosiloxane containing compounds of Formulas II, IV, and VI may be isolated by evaporating remaining solvent.

Fire Foam Compositions

Some embodiments described are fire foam compositions including one or more of the organosiloxane and polyorganosiloxane containing compounds described herein. The fire foam composition may be any aqueous film forming foam (AFFF) or alcohol resistant film forming foam (AR-AFFF). These fire foams may be present as a concentrated composition. The concentrates may be produced at any suitable strength, including, but not limited to, 1, 3 and 6% (w/w) foam concentrates, which are concentrations that are typical for commercial use. Concentrates that are less than 1% (w/w) or greater than 6% (w/w) also may be prepared. The foam concentrates are mixed with water, which may include pure, deionized or distilled water, tap or fresh water, sea water, brine, or an aqueous or water-containing solution or mixture capable of serving as a water component for the firefighting foam composition.

Conventional AFFF concentrates contain mixtures of perfluoroalkyl and non-fluorinated hydrocarbon surfactants, each of which may be anionic, cationic, nonionic or amphoteric, solvents such as glycols and/or glycol ethers, and minor additives such as chelating agents, pH buffers, corrosion inhibitors and the like. Various conventional AFFF concentrates are described in, for example, U.S. Pat. Nos. 3,047,619; 3,257,407; 3,258,423; 3,562,156; 3,621,059; 3,655,555; 3,661,776; 3,677,347; 3,759,981; 3,772,199; 3,789,265; 3,828,085; 3,839,425; 3,849,315; 3,941,708; 3,795,075; 3,957,657; 3,957,658; 3,963,776; 4,038,198; 4,042,522; 4,049,556; 4,060,132; 4,060,489; 4,069,158; 4,090,976; 4,099,574; 4,149,599; 4,203,850; 4,209,407; and 8,431,036 each of which is incorporated by reference herein. AR-AFFF concentrates are described in, for example, U.S. Pat. Nos. 4,060,489; 4,149,599 and 4,387,032, each of which is incorporated by reference herein.

In contrast to the conventional fire foams mentioned above, the fire foam compositions described herein have little to no fluorine or fluorosurfactants. Thus, in some embodiments, the firefighting foam compositions have less than 5% by weight of fluorine. In some embodiments, the firefighting foam compositions have less than 1% by weight of fluorine. In some embodiments, the firefighting foam compositions have less than 0.5% by weight of fluorine. In some embodiments, the firefighting foam compositions are substantially free of fluorine. In some embodiments, the firefighting foam compositions are free of fluorine.

In some embodiments, the firefighting foam compositions have less than 5% by weight of fluorinated surfactants. In some embodiments, the firefighting foam compositions have less than 1% by weight of fluorinated surfactants. In some embodiments, the firefighting foam compositions have less than 0.5% by weight of fluorinated surfactants. In some embodiments, the firefighting foam compositions are substantially free of fluorinated surfactants. In some embodiments, the firefighting foam compositions are free of fluorinated surfactants.

In some embodiments, the firefighting foams as described herein have a composition as shown in Table 1.

TABLE 1

Exemplary firefighting foam composition

| Ingredient | Percent by weight |
| --- | --- |
| Polyorganosiloxane compounds of Formulas I-VII | 0.1-25 |
| Zwitterionic surfactant | 0-10 |
| Nonionic surfactant | 0-10 |
| Anionic surfactant | 0-10 |
| Foam stabilizer/foam aid | 0-15 |
| Water miscible solvent | 0-15 |
| Corrosion inhibitor | 0-5 |
| Film formers/thickeners | 0-10 |
| Antimicrobials/biocides | 0-0.05 |
| Electrolytes | 0-5 |
| Water | to 100% |

As described herein, the firefighting foam concentrates may be formulated at different concentrations, for example from 1% to 6%. As used herein, the lowest percent concentrate indicates the most concentrated foam composition. Thus, a 1% concentrate solution as a use strength pre-mix is formed after mixing 1 part of concentrate (e.g., a concentrate of Table 1) with 99 parts of water and a 6% use strength pre-mix solution is formed after mixing 6 parts of the concentrate (e.g., a concentrate of Table 1) with 94 parts of water. The water used in the firefighting foam compositions and for diluting a foam concentration to use strength may include pure, deionized or distilled water, tap or fresh water, sea water, brine, or an aqueous or water-containing solution or mixture capable of serving as a water component.

The concentration strength may be increased or decreased. For example, to prepare a 1% concentrate solution from a 3% concentrate solution, the weight amount of each agent in the firefighting foam composition concentrate would be increased by a factor of 3. Alternatively, to prepare a 3% concentrate solution from a 1% concentrate solution, the weight of each agent would be decreased by a factor of 3.

In some embodiments described herein, the polyorganosilicon and organosilicon compounds described herein are used in a firefighting foam composition. In some embodiments, the firefighting foam compositions include one or more polyorganosilicon compounds according to Formulas I-VII. In some embodiments, the firefighting foam compositions include a polyorganosilicon compound according to Formula I. In some embodiments, the firefighting foam compositions include a polyorganosilicon compound according to Formula II. In some embodiments, the firefighting foam compositions include a polyorganosilicon compound according to Formula III. In some embodiments, the firefighting foam compositions include a polyorganosilicon compound according to Formula IV. In some embodiments, the firefighting foam compositions include a polyorganosilicon compound according to Formulas V. In some embodiments, the firefighting foam compositions include a polyorganosilicon compound according to Formulas VI. In some embodiments, the firefighting foam compositions include a polyorganosilicon compound according to Formula VII.

In some embodiments, the firefighting foam compositions include from about 0.1% to about 25% by weight of one or more polyorganosilicon compounds according to any one of Formulas I-VII described herein. In some embodiments, the firefighting foam compositions include from about 0.1% to about 20% by weight of one or more polyorganosilicon compounds according to any one of Formulas I-VII described herein. In some embodiments, the firefighting foam compositions include from about 0.1% to about 15% by weight of one or more polyorganosilicon compounds according to any one of Formulas I-VII described herein. In some embodiments, the firefighting foam compositions include from about 0.1% to about 10% by weight of one or more polyorganosilicon compounds according to any one of Formulas I-VII described herein. In some embodiments, the firefighting foam compositions include from about 0.1% to about 5% by weight of one or more polyorganosilicon compounds according to any one of Formulas I-VII described herein. In some embodiments, the firefighting foam compositions include from about 0.1% to about 3% by weight of one or more polyorganosilicon compounds according to any one of Formulas I-VII described herein. In some embodiments, the firefighting foam compositions include from about 0.1% to about 1% by weight of one or more polyorganosilicon compounds according to any one of Formulas I-VII described herein.

In some embodiments, the firefighting foam compositions described herein include an additional silicon containing compound of structure S1:

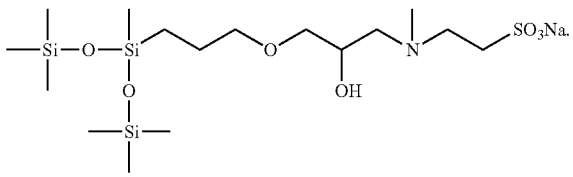

In some embodiments, the fire foam compositions contain additional hydrocarbon surfactants. These surfactants promote foam formation following aeration. The use of additional surfactants also functions to promote foam spreading, drainage, fluidity, and expansion. In addition, the use of surfactants may aid in the solubilization of other components in hard water, sea water or brine solutions. The additional hydrocarbon surfactant may be anionic, zwitterionic/amphoteric, or cationic having a linear carbon chain of about 6 to 20 carbon atoms. In the present context, the reference to surfactants of different charge types refers to, for example, anionic and non-ionic surfactants, or anionic and zwitterionic surfactants.

Exemplary and non-limiting zwitterionic or amphoteric hydrocarbon surfactants include, but are not limited to, those which contain in the same molecule, amino and carboxy, sulfonic, and sulfuric ester moieties, such as amine oxides, aminopropionates, sultaines, sulfobetaines, alkyl sulfobetaines, alkyl betaines, alkylamidobetaines, dihydroxyethyl glycinates, imidazoline acetates, imidazoline propionates, and imidazoline sulfonates. Commercially available products include Chembetaine CAS (Lubrizol Inc.), Mirataine™ H2C-HA (sodium laurimino dipropionate), Miranol™ C₂M-SF Conc. (sodium cocoampho propionate), Mirataine™ CB (cocamidopropyl betaine), Mirataine™ CBS (cocamidopropyl hydroxysultaine), and Miranol™ JS Conc. (sodium caprylampho hydroxypropyl sultaine), all commercially available from Rhone-Poulenc Corp.; imidazole-based surfactants are described in U.S. Pat. No. 3,957,657, which is incorporated by reference herein for its teachings thereof. In some aspects, the zwitterionic surfactant includes an alkyl sulfobetaine.

Exemplary and non-limiting anionic hydrocarbon surfactants include, but are not limited to, $C_8$-$C_{16}$ alkyl surfactants, alkyl carboxylates, alkyl sulfates, sulfonates, and their ethoxylated derivatives. Examples of alkyl sulfates include but are not limited to sodium octyl sulfate (e.g., Sipex™ OLS, commercially available from Rhone-Poulenc Corp., Cranberry, N.J.) and sodium decyl sulfate (e.g., Polystep™ B-25, commercially available from Stepan Co., Northfield, Ill.); alkyl ether sulfates such as $C_nH_{2n+1}(OC_2H_4)_2OSO_3Na$, where $6 \leq n \leq 12$ (e.g., Witcolate™ 7093, commercially available from Witco Corp., Chicago, Ill.); and alkyl sulfonates such as $C_nH_{2n+1}SO_3Na$, where $6 \leq n \leq 12$. In additional alkali metal and ammonium salts are suitable. In some aspects, the one or more anionic hydrocarbon surfactants includes decyl sulfate.

Suitable nonionic surfactants include, but are not limited to, polyoxyethylene derivatives of alkylphenols, linear or branched alcohols, fatty acids, alkylamines, alkylamides, and acetylenic glycols, alkyl glycosides and alkyl polyglycosides available as, for example, APG 325N (DeWolf Chemical), block polymers of polyoxyethylene and polyoxypropylene units. Additional nonionic surfactants are described in U.S. Pat. No. 5,207,932, which is incorporated by reference herein. In some aspects, the nonionic surfactant is an alkyl polyglycoside (e.g., APG 325N).

In some embodiments, the firefighting foams include one or more water-soluble polymeric film formers or thickeners. In some embodiments, these film formers or thickeners are suitable for AR-AFFF concentrates for extinguishing fires involving polar solvents or fuels. These film formers precipitate from solution when the foam bubbles come into contact with the polar solvents and fuel and form a vapor-repelling polymer film at the solvent/foam interface, preventing foam collapse. Examples of suitable compounds include thixotropic polysaccharide gums as described in U.S. Pat. Nos. 3,957,657; 4,060,132; 4,060,489; 4,306,979; 4,387,032; 4,420,434; 4,424,133; 4,464,267, 5,218,021, and 5,750,043, 6,262,128, and 7,868,167 each of which are incorporated by reference herein.

Exemplary and non-limiting commercially available film forming compounds are marketed as Rhodopol, Keltrol, Kelco, Actigum, Cecal-gum, Galaxy, and Kelzan. Additional exemplary gums and resins useful as film formers include acidic gums such as xanthan gum, diutan gum, pectic acid, alginic acid, agar, carrageenan gum, rhamsam gum, welan gum, mannan gum, locust bean gum, galactomannan gum, pectin, starch, bacterial alginic acid, succinoglucan, gum arabic, carboxymethylcellulose, heparin, phosphoric acid polysaccharide gums, dextran sulfate, dermantan sulfate, fucan sulfate, gum karaya, gum tragacanth and sulfated locust bean gum. Exemplary and non-limiting neutral polysaccharides useful as film formers include: cellulose, hydroxyethyl cellulose, dextran and modified dextrans, neutral glucans, hydroxypropyl cellulose, as well, as other cellulose ethers and esters. Modified starches include starch esters, ethers, oxidized starches, and enzymatically digested starches. In some embodiments, the one or more film forming compounds includes diutan gum.

Foam aids may be used to enhance foam expansion and drain properties, while providing solubilization and antifreeze action. Exemplary and non-limiting foam aids include alcohols or ethers such as ethylene glycol monoalkyl ethers, polyethylene glycol, diethylene glycol monoalkyl ethers, propylene glycol, dipropylene glycol monoalkyl ethers, triethylene glycol monoalkyl ethers, 1-butoxyethoxy-2-propanol, glycerine, hexylene glycol, and trimethylglycine. Useful foam aids are known, see, for example, in U.S. Pat. Nos. 5,616,273, 3,457,172; 3,422,011 and 3,579,446, and in PCT International Application Pub. No. WO 2014/153140 each of which is incorporated by reference herein. In some embodiments, the one or more foam aids includes propylene glycol.

In some embodiments, the firefighting foams include one or more chelators or sequestering buffer. Exemplary and non-limiting chelators and sequestering buffers include agents that sequester and chelate metal ions, including polyaminopolycarboxylic acids, ethylenediaminetetraacetic acid, citric acid, tartaric acid, nitrilotriacetic acid, hydroxyethylethylenediaminetriacetic acid and salts thereof. Exemplary buffers include Sorensen's phosphate or McIlvaine's citrate buffers.

In some embodiments, the firefighting foams include one or more corrosion inhibitors. Exemplary and non-limiting corrosion inhibitor includes ortho-phenylphenol, tolyltriazole, and phosphate ester acids. In some embodiments, the corrosion inhibitor is tolyltriazole.

In some embodiments, the firefighting foams include one or more electrolytes. An electrolyte present in small quantities may balance the performance of fire foam agents when mixed with water ranging from soft to very hard, including sea water or brine, and to improve agent performance in very soft water. Typical electrolytes include salts of monovalent or polyvalent metals of Groups 1, 2, or 3, or organic bases. Exemplary and non-limiting alkali metals useful in the fire foam compositions described herein are sodium, potassium, or magnesium. Exemplary and non-limiting organic bases include ammonium, trialkylammonium, bis-ammonium salts and the like. Additional electrolytes include, but are not limited to sulfates, bisulfates, phosphates, nitrates and polyvalent salts including magnesium sulfate and magnesium nitrate. In some embodiments, the electrolyte is magnesium sulfate.

In some embodiments, the firefighting foam includes one or more antimicrobial, biocidal, or preservatives. These components are included to prevent the biological decomposition of natural product based polymers that are incorporated as polymeric film formers (e.g., a polysaccharide gum). Examples include Kathon CG/ICP (Rohm & Haas Company), Givgard G-4 40 (Givaudan, Inc.), and Dowicil 75 (Dow Chemical Company). Additional preservatives are disclosed in U.S. Pat. Nos. 3,957,657; 4,060,132; 4,060,489; 4,306,979; 4,387,032; 4,420,434; 4,424,133; 4,464,267, 5,207,932, 5,218,021, and 5,750,043, each of which is incorporated by reference herein. In some aspects, the biocidal agent is Dowicil 75.

In some embodiments, the firefighting foam includes one or more water miscible non-aqueous solvents. Exemplary and non-limiting solvents include hexylene glycol, butyl carbitol, butyl cellosolve, polyethylene glycol, methyl diproxitol, propylene glycol, propylene glycol n-propyl ether, and tripropylene glycol methyl ether. In some embodiments, the one or more non-aqueous solvents is propylene glycol. In some embodiments, the one or more non-aqueous solvents is butyl carbitol. In some aspects, the one or more non-aqueous solvents is butyl carbitol and propylene glycol.

Methods of Using Firefighting Foams

Some embodiments described herein are methods of using the firefighting foam compositions described herein to extinguish a fire. The firefighting foam compositions described herein are introduced into a fire or flame in an amount sufficient to extinguish the fire or flame. One skilled in the art will recognize that the amount of extinguishing composition needed to extinguish a particular hazard will depend upon the nature and extent of the hazard. In some aspects, the firefighting foams described herein are used to extinguish a class A fire. In some aspects, the firefighting foams described herein are used to extinguish a class B fire. In some aspects, the firefighting foams described herein are used to extinguish a class C fire. In some aspects, the firefighting foams described herein are used to extinguish a class D fire. In some aspects, the firefighting foams described herein are used to extinguish a class K fire. The fire foam agents and percent weight of the fire foam compositions described herein may be modified to suit the class of fire being extinguished as would be understood by a person of skill in the art.

In some embodiments, the foam composition can be applied to a variety of substrates, including liquid non-polar (e.g., petrol) and polar liquid chemicals. The applied foam spreads quickly as a thick yet mobile blanket over a surface of a liquid chemical, for rapid coverage and/or extinguishment of a fire. In the case of a burning liquid chemical, drainage from the foam composition (i.e., the aqueous phase) drains and spreads as a film over the surface of the liquid chemical. If the film becomes disturbed or broken, it has properties to reform to seal vapors (sometimes existing at elevated temperatures) and prevent ignition or re-ignition of the liquid chemical. The foam compositions described herein remain in the form of a foam blanket over the liquid chemical to provide continued vapor suppression and resistance to ignition or re-ignition (i.e., burnback resistance) of the liquid chemical for a significant time after extinguishment.

In some embodiments, the firefighting foam concentrates are mixed with water to form a use strength formulation. In some embodiments, the firefighting foams are mixed as a 3% solution, and foamed using foaming devices well known in the art. As water under pressure passes through a fire hose, typically 3 percent by volume of the concentrate composition is inducted into the hose line by the Venturi effect to form a foam solution of the concentrate diluted with water. The solution becomes aerated to produce finished foam by use of an air-aspirating nozzle located at the outlet end of the hose. A foam solution stored for any length of time prior to aeration is known as a foam premix and can likewise be aerated to produce finished foam. Equipment which can be used to produce and apply these aqueous air-foams are known in the art and also are described in publications by the National Fire Protection Association.

In some embodiments, the foaming composition, containing the foam agents as described herein exists as a transitory composition as a flow of water within a fire-fighting foam dispenser (e.g., a fire hose). Therefore, after formation of the foaming composition, the foaming composition can be aerated by methods that are well understood in the art of foam compositions, e.g., using an air-aspirating nozzle, to form a foam composition including a vapor phase (e.g., air) entrained in a liquid phase (e.g., aqueous). The amount of air generally included in the foam can be such that the air will be the major component of the foam by volume, e.g., greater than about 50 percent by volume, for example from about 75 to 98 percent by volume air. In some embodiments, the foam for most applications has a density of less than 1 gram per cubic centimeter with a defined expansion rate ratio (volume of expanded foam in relation to the weight of unexpanded foam in grams).

In some embodiments, the firefighting foam has an expansion ratio from about 2 to 1 to about 1000 to 1. In some embodiments, the firefighting foam is low expansion foam having an expansion ratio of about 2 to 1 to about 20 to 1. In some embodiments, the firefighting foam is medium expansion foam having an expansion ratio of about 20 to 1 to about 200 to 1. In some embodiments, the firefighting foam is high expansion foam having an expansion ratio of about 200 to 1 to about 1000 to 1.

EXAMPLES

Example 1. Synthesis of a Polyorganosiloxane Containing Compound of Formula III

The polyorganosiloxane containing compound of Formula III was synthesized according to reaction 1. To a 250 ml round bottom flask was added 9 g (0.01 mol) poly (dimethylsiloxane), diglycidyl ether terminated (CAS #130167-23-6) (Mw~900), 60 ml of iso-propanol, 28 ml of water and 5.47 g (0.0204 mol) of 60% n-methyltaurine (CAS #107-68-6) aqueous solution. The reaction mixture was stirred at 60~65° C. for one day followed by the evaporation of iso-propanol to ~50 (wt) % of a concentrate as final desired product.

Reaction 1:

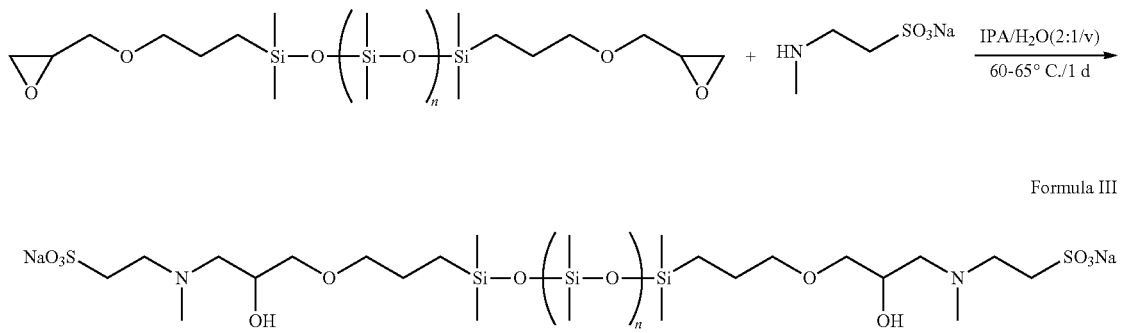

where n is defined as for Formula III described herein.

Example 2. Synthesis of a Polyorganosiloxane Containing Compound According to Structure S1

The organosiloxane containing compound of structure S1 was synthesized according to reaction 2. To a 250 ml round bottom flask was added (3-glycidoxypropyl)-bis-(trimethylsiloxy)methylsilane, sodium 2-(methylamino) ethane-1-sulfonate, IPA, and water, where the IPA and water were added in a 2 to 1 ratio. The reaction mixture stirred at 60-65° C. for one day in a closed system followed by the evaporation to remove iso-propanol to give ~98 (wt) % concentrate as final desired product.

Reaction 2:

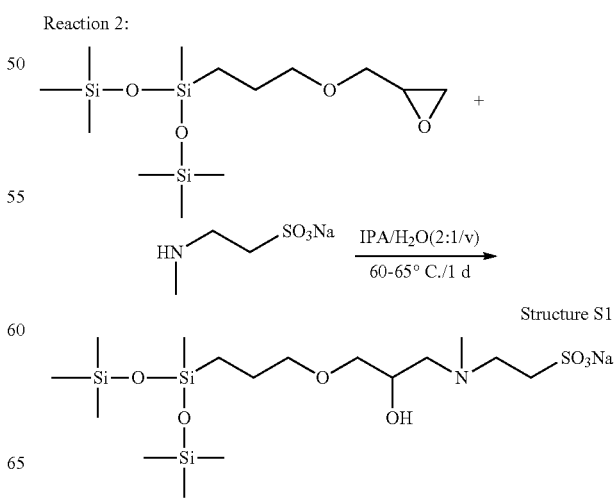

Example 3. Synthesis of a Polyorganosiloxane Containing Compound of Formula V The polyorganosiloxane containing compound of Formula V was synthesized according to reaction 3. To a 500 ml round bottom flask was added 24.8 g (0.045 mol) of poly(dimethylsiloxane), diglycidylether terminated (CAS #130167-23-6), (Mw~500-600), 180 ml of iso-propanol and 33.6 g (0.06 mol) of Jeffamine-600 (CAS #65605-38-9) (Mw~650). The reaction mixture was stirred at 60~65° C. for one day in a system. An aqueous solution of 12.4 g (0.06 mol) of 3-chloro-2-hydroxy-propane acid (CAS #143218-48-8), sodium salt in 90 ml of water was added to the above mixture. The reaction mixture stirred at 70° C. for one day in a closed system followed by the evaporation to remove iso-propanol to give ~52 (wt) % concentrate as final desired product.

Reaction 3:

Example 4. Synthesis of a Polyorganosiloxane Containing Compound of Formula IX The polyorganosiloxane containing compound of Formula IX was synthesized according to reaction 4. To a 250 ml round bottom flask was added 0.98 g (0.001 mol) of poly(dimethylsiloxane), diglycidylether terminated (CAS #130167-23-6), (Mw~980), 60 ml of iso-propanol, 30 ml of distilled water and 10 g (0.001 mol) of branched PEI (Mw~10,000 g/mol; CAS #9002-98-6). The reaction mixture was stirred at 55~60° C. for one day in a closed system. 0.2 g (0.001 mol) of 3-chloro-2-hydroxy-propane sulfonic acid (CAS #143218-48-8), sodium salt was added to the above mixture. The reaction mixture was stirred at 70° C. for one day in a closed system followed by the evaporation to remove iso-propanol to give ~40 (wt) % aqueous concentrate as final desired product.

Reaction 3:

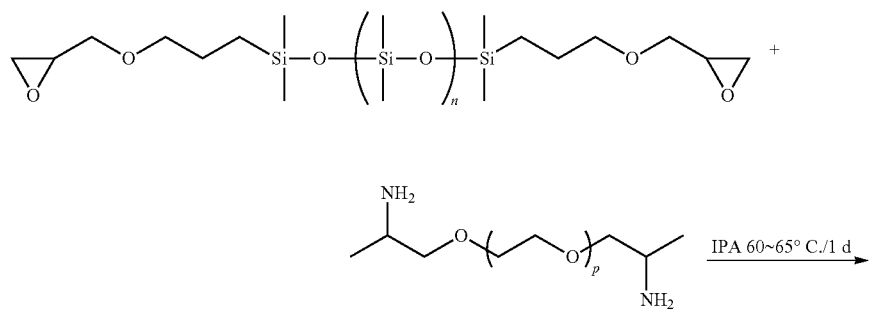

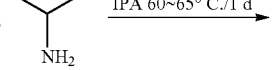

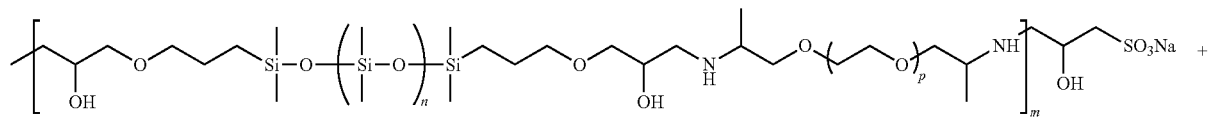

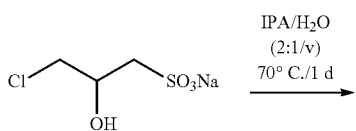

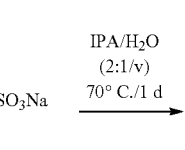

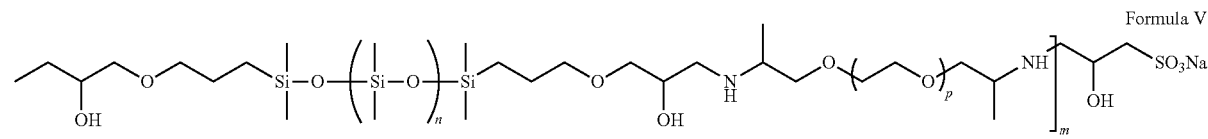

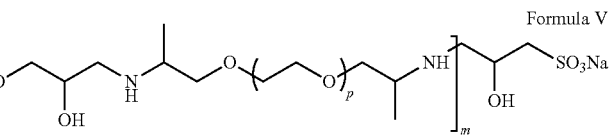

Formula V where n, p, and m are defined for Formula V described herein.

Reaction IV:

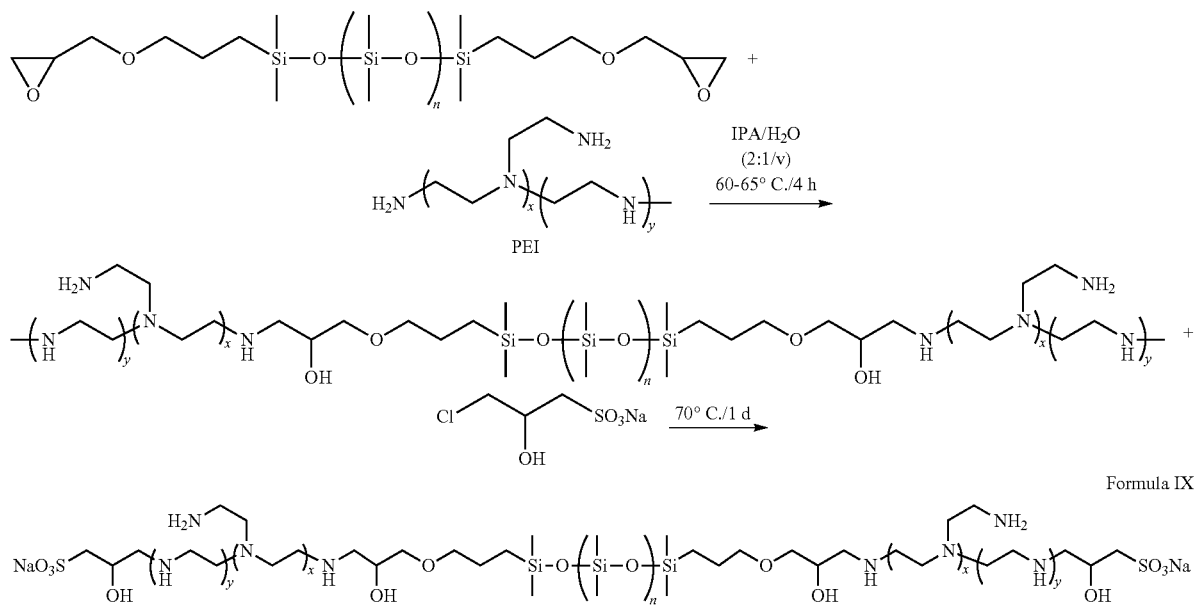

where n is an integer from 2-20, y and x are each an integer greater than or equal to 1 and where the ratio of y to x is 2:1.

Example 5. Fire Testing of a Fire Foam Including Organosiloxane and Polyorganosiloxane Containing Compounds as Active Ingredients A 3% concentrate test fire foam according to Table 2 was generated. This foam was subsequently evaluated to determine the fire extinguishing performance of a mixture of silicon polymers and silicon containing compounds described herein. A total of 2,500 grams of a 3% premix was made using tap water. The premix was stirred with an overhead mixer for 5 minutes yielding a mixture that was mostly clear to slightly hazy with no obvious solids present.

TABLE 2

Exemplary Organosiloxane containing firefighting foam composition

| Foam Agent Class | Foam Agent | Grams | % w/w |
|---|---|---|---|
| Non-fluorinated compound 1 | Organosiloxane of Structure S1 | 3.63 (55% pure) | 1.01 |
| Non-fluorinated compound 2 | Polyorganosiloxane of Formula III | 2.87 (62.6% pure) | 0.91 |
| Non-fluorinated compound 3 | Polyorganosiloxane of Formula V | 1.84 (>98% pure) | 0.91 |
| Nonionic surfactant | APG 325N | 10 | 5.07 |
| Zwitterionic surfactant | Alkyl-sulfobetaine | 5 | 2.53 |
| Anionic surfactant | Decyl sulfate | 22 | 11.15 |
| Electrolytes | $MgSO_4$ | 3 | 1.52 |
| Corrosion inhibitor | Tolyltriazole | 0.08 | 0.04 |
| Antimicrobials/biocides | Dowicil 75 | 0.06 | 0.03 |
| Water miscible solvent | Butyl carbitol | 15 | 7.60 |
| Foam stabilizer/foam aid | Propylene glycol | 8 | 4.06 |
| Film formers/thickeners | Diutan | 0.92 | 0.47 |
| Water | Tap water | 127.6 | 64.69 |
| Total | | 200 | 100 |

The foam according to Table 2 was then used in burn tests to extinguish hydrophobic (heptane) and hydrophilic (acetone) based solvent fires. The equipment used for dispensing and fire testing of the foam was a pan containing the specified ignitable fuel, a nozzle, turntable, air gauge, and stop watch.

The foam was first dispensed on a mixture of 500 ml of heptane and 500 ml of water in a pan at a pressure of 25 psi (0.1896 gpm). The foam was applied for 24 seconds and the pan was covered by the foam in 13 seconds with extinguishment in 24 seconds. The foam demonstrated burnback resistance for 10:29 (mm:ss) with ~8% of the foam blanket open at 09:40.

Next, the foam was dispensed on a mixture of 1000 ml of acetone in a pan at a pressure of 25 psi (0.1896 gpm). The foam was applied for 90 seconds and the pan was covered by the foam in 20 seconds with extinguishment in 31 seconds. The foam demonstrated burnback resistance for 20:40 (mm:ss) with ~50% of the foam blanket open at 19:40.

It is further contemplated that the firefighting foams described herein exhibit burn back resistance and fire extinguishment when formulated with a single polyorganosiloxane containing compound according to any one of Formulas I-VII or as a mixture or combination of polyorganosiloxane containing compounds according to Formulas I-VII Although the invention herein has been described in connection with described embodiments thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

Statements

1. A polyorganosiloxane compound of Formula II:

$$X-L-B\underset{OH}{\overset{R^3}{\diagdown}}O\diagdown\underset{R^4}{\overset{R^3}{\underset{|}{Si}}}-O-\left(\underset{R^2}{\overset{R^1}{\underset{|}{Si}}}-O\right)_n\underset{R^6}{\overset{R^5}{\underset{|}{Si}}}\diagdown O\diagdown B-L-X,$$

wherein n is from 1-20;
$R^1$, $R^2$, $R^3$, $R^4$, $R^5$, and $R^6$ are each independently $C_{1-3}$ alkyl;
B is selected from S, O, and $-N(R^7)-$, wherein $R^7$ is selected from H and $C_q 2_{q+1}$, wherein q is an integer from 1 to 3;
L is selected from $C_1$-$C_6$ alkylene, $C_5$-$C_6$ cycloalkylene, and benzyl; and
X is selected from $-CO_2H$, $-CO_2M$, $-SO_3H$, $-SO_3M$, and $-NH_4T$, wherein M is a countercation and T is a counteranion.

2. A polyorganosiloxane compound of Formula IV:

$$X-L-\left[B\underset{OH}{\overset{R^3}{\diagdown}}O\diagdown\underset{R^4}{\overset{R^3}{\underset{|}{Si}}}-O-\left(\underset{R^2}{\overset{R^1}{\underset{|}{Si}}}-O\right)_n\underset{R^6}{\overset{R^5}{\underset{|}{Si}}}\diagdown O\diagdown B\right]_m L-X,$$

wherein n is from 1-20;
m is from 1 to 1,000,000;
$R^1$, $R^2$, $R^3$, $R^4$, $R^5$, and $R^6$ are each independently $C_{1-3}$ alkyl;
B is $-NH-CH(CH_3)(CH_2)-O-(CH_2CH_2-O)_p-(CH_2)(CH_3)CH-NH-$, wherein p is an integer from 2 to 40;
L is selected from $C_1$-$C_{12}$ alkylene, $-CH_2CH(OH)CH_2-$; and
X is selected from $-CO_2H$, $-CO_2M$, $-SO_3H$, $-SO_3M$, and $-NH_4T$, wherein M is a countercation and T is a counteranion.

3. A polyorganosiloxane compound of Formula VI:

$$X-L-\left[Y-B\underset{OH}{\overset{R^3}{\diagdown}}O\diagdown\underset{R^4}{\overset{R^3}{\underset{|}{Si}}}-O-\left(\underset{R^2}{\overset{R^1}{\underset{|}{Si}}}-O\right)_n\underset{R^6}{\overset{R^5}{\underset{|}{Si}}}\diagdown O\diagdown B-Y\right]_m L-X,$$

wherein n is from 1-20;
m is from 1 to 1,000;
$R^1$, $R^2$, $R^3$, $R^4$, $R^5$, and $R^6$ are each independently $C_{1-3}$ alkyl;
B is selected from a secondary amine and a tertiary amine;
Y is a linear or branched polyethylenimine;
L is selected from $C_1$-$C_{12}$ alkylene and $-CH_2CH(OH)CH_2-$; and
X is selected from $-CO_2H$, $-CO_2M$, $-SO_3H$, $-SO_3M$, and $-NH_4T$, wherein M is a countercation and T is a counteranion.

4. The polyorganosiloxane compound according to any one of statements 1-3, wherein $R^1$, $R^2$, $R^3$, $R^4$, $R^5$, and $R^6$ are the same.

5. The polyorganosiloxane compound according to any one of statements 1-4, wherein $R^1$, $R^2$, $R^3$, $R^4$, $R^5$, and $R^6$ are different.

6. The polyorganosiloxane compound according to any one of statements 1-4, wherein $R^1$, $R^2$, $R^3$, $R^4$, $R^5$, and $R^6$ are methyl.

7. The polyorganosiloxane compound according to any one of statements 1-6, wherein the counteranion is a halide selected from $Cl^-$, $Br^-$, and $I^-$.

8. The polyorganosiloxane compound according to any one of statements 1-6, wherein the countercation is selected from $Na^+$ and $K^+$.

9. The polyorganosiloxane compound according to any one of statements 1-8, wherein n is an integer from 5 to 15.

10. The polyorganosiloxane compound according to statement 2, wherein p is an integer from 10 to 20.

11. The polyorganosiloxane compound according to statement 3, wherein the polyethylenimine comprises a molecular weight of from about 1,000 to about 10,000.

12. The polyorganosiloxane compound according to any one of statements 3 and 11, wherein the polyethylenimine comprises about 25% tertiary amine.

13. The polyorganosiloxane compound according to any one of statements 3 and 11-12, wherein the polyethylenimine comprises about 50% secondary amine.

14. The polyorganosiloxane compound according to any one of statements 3 and 11-13, wherein the polyethylenimine comprises about 25% primary amine.

15. The polyorganosiloxane compound according to any one of statements 3 and 11-14, wherein the polyethylenimine is of Formula IV:

$$NH_2-(CH_2CH_2N)_x-(CH_2CH_2NH)_y-\underset{CH_2CH_2NH_2}{|}$$

wherein a ratio of y to x is 2:1 and the polyethylenimine has a number average molecular weight selected from 1,200 g/mol, 1,800 g/mol, and 10,000 g/mol.

16. The polyorganosiloxane compound of statement 1, wherein X is $SO_3M$; M is $Na^+$; L is a $C_2$ alkylene; and B is $-N(R^7)-$, wherein q is 1.

17. The polyorganosiloxane compound of statement 16 according to Formula III:

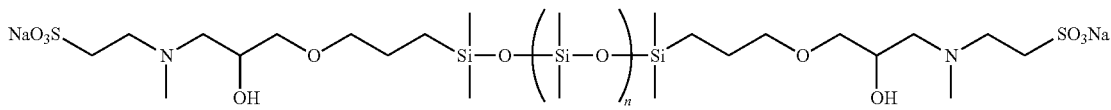

wherein n is an integer from 1 to 20.

18. The polyorganosiloxane compound of statement 2, wherein L is —CH$_2$CH(OH)CH$_2$—; X is SO$_3$M; and M is Na$^+$.

19. The polyorganosiloxane compound of statement 18 according to Formula V:

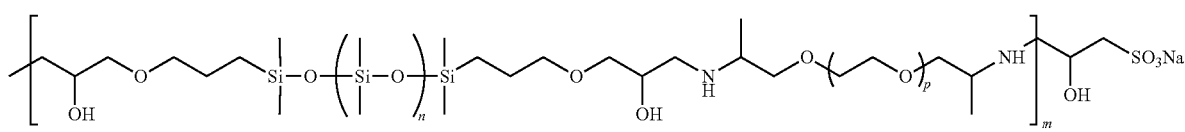

wherein n is an integer from 1 to 20; m is an integer from 1 to 1,000,000, and p is an integer from 2 to 40.

20. The polyorganosiloxane compound of statement 3, wherein X is SO$_3$M; M is Na$^+$; and L is —CH$_2$CH(OH)CH$_2$—.

21. The polyorganosiloxane compound of statement 20 according to Formula VII:

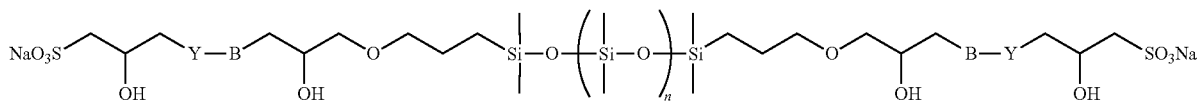

wherein n is an integer from 1 to 20.

22. The polyorganosiloxane compound according to any one of statements 1-21, wherein the polyorganosiloxane compound has a hydrophilic lipophilic balance of from 2 to 20.

23. The polyorganosiloxane compound according to any one of statements 1-21, wherein the polyorganosiloxane compound has a polydispersity index of about 2 to about 20.

24. The polyorganosiloxane compound according to any one of statements 1-21, wherein the polyorganosiloxane compound has a weight average molecular weight of about 750 g/mol to about 500,000 g/mol.

25. The polyorganosiloxane compound according to any one of statements 1-21, wherein the polyorganosiloxane compound has a number average molecular weight of about 750 g/mol to about 500,000 g/mol.

26. A method of making the polyorganosiloxane compound of statement 1 comprising
(a) providing a diglycidyl ether terminated polyorganosiloxane of Formula IX:

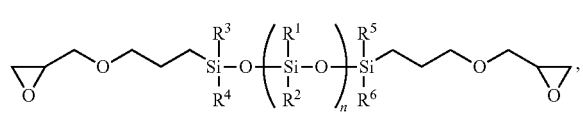

wherein n is an integer from 1 to 20; and (b) adding to a reaction mixture comprising the diglycidyl ether terminated polyorganosilicon compound a reactant NH(CH$_3$)CH$_2$CH$_2$X.

27. A method of making the polyorganosiloxane compound according to statement 2 comprising (a) providing a diglycidyl ether terminated polyorganosiloxane of Formula IX:

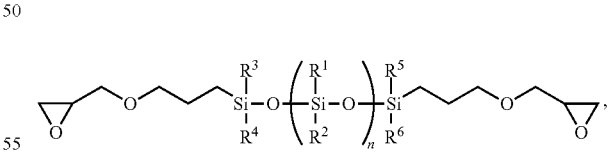

wherein n is an integer from 1 to 20;

(b) adding to a reaction mixture comprising the diglycidyl ether terminated polyorganosiloxane a first reactant CH$_3$CH(NH$_2$)CH$_2$—O—(CH$_2$CH$_2$—O)$_p$—CH$_2$(NH$_2$)CHCH$_3$; and (c) adding a second reactant LCH$_2$CH(OH)CH$_2$X to the reaction mixture, wherein L is a leaving group selected from Cl$^-$, Br$^-$, and I$^-$.

28. A method of making the polyorganosiloxane compound according to statement 3 comprising
(a) providing a diglycidyl ether terminated polyorganosiloxane of Formula IX:

$$\text{\Large{epoxide-CH}_2\text{-O-(CH}_2)_3\text{-Si(R}^3)(R^4)\text{-O-[Si(R}^1)(R^2)\text{-O]}_n\text{-Si(R}^5)(R^6)\text{-(CH}_2)_3\text{-O-CH}_2\text{-epoxide}}$$

wherein n is an integer from 1 to 20;
(b) adding to a reaction mixture comprising the diglycidyl ether terminated polyorganosiloxane a first reactant selected as a linear or branched polyethyleneimine; and
(c) adding a second reactant $LCH_2CH(OH)CH_2X$ to the reaction mixture, wherein L is a leaving group selected from $Cl^-$, $Br^-$, and $I^-$.

29. The method of statement 28, wherein the polyethylenimine is of Formula VIII:

$$NH_2-(CH_2CH_2N)_x-(CH_2CH_2NH)_y-,$$
$$\qquad\qquad\;\;|$$
$$\qquad\quad CH_2CH_2NH_2$$

wherein a ratio of y to x is 2:1 and the polyethylenimine has a number average molecular weight selected from 1,200 g/mol, 1,800 g/mol, and 10,000 g/mol.

30. A firefighting foam composition comprising a polyorganosiloxane compound according to any one of statements 1-29.

31. The firefighting foam composition of statement 30, wherein the polyorganosiloxane compound promotes a spreading and a stabilization of the firefighting foam.

32. The firefighting foam of statement 30, further comprising one or more surfactants, one or more solvents, one or more electrolytes, one or more foam stabilizers, one or more film formers, one or more corrosion inhibitors, or one or more antimicrobials.

33. The firefighting foam composition according to any one of statements 30-32, wherein the polyorganosiloxane compound comprises about 0.01% to about 25% of the foam composition.

34. The firefighting foam composition according to any one of statements 32-33, wherein the one or more surfactants comprises a non-ionic surfactant, a zwitterionic surfactant, or an anionic surfactant, or a combination thereof.

35. The firefighting foam composition according to any one of statements 32-34, wherein the one or more surfactants comprises a non-ionic surfactant selected from polyoxyethylene derivatives of alkylphenols, linear or branched alcohols, fatty acids, alkylamines, alkylamides, and acetylenic glycols, alkyl glycosides and alkyl polyglycosides.

36. The firefighting foam composition according to any one of statements 32-34, wherein the one or more surfactants comprises a zwitterionic surfactant selected from amine oxides, aminopropionates, sultaines, sulfobetaines, alkyl sulfobetaines, alkyl betaines, alkylamidobetaines, dihydroxyethyl glycinates, imadazoline acetates, imidazoline propionates, and imidazoline sulfonates.

37. The firefighting foam composition according to any one of statements 32-34, wherein the one or more surfactants comprises an anionic surfactant selected from alkyl carboxylates and alkyl sulfates.

38. The firefighting foam of statement 32, wherein the one or more solvents is selected from hexylene glycol, butyl carbitol, butyl cellulose, polyethylene glycol, methyl diproxitol, propylene glycol, propylene glycol n-propyl ether, and tripropylene glycol methyl ether.

39. The firefighting foam of statement 32, wherein the one or more stabilizers are selected from ethylene glycol monoalkyl ethers, polyethylene glycol, diethylene glycol monoalkyl ethers, propylene glycol, dipropylene glycol monoalkyl ethers, triethylene glycol monoalkyl ethers, 1-butoxyethoxy-2-propanol, glycerine, hexylene glycol, and trimethylglycine.

40. The firefighting foam according to any one of statements 30-39, wherein the foam is selected from a low-expansion foam, a medium expansion foam, and a high-expansion foam.

41. A method of extinguishing a fire comprising administering to a fire, the firefighting foam composition according to any one of statements 30-40.

42. The method of statement 41, wherein the fire is a class A fire, a class B, a class C fire, or a class K fire.

What is claimed is:
1. A polyorganosiloxane compound having a Formula:

$$X-L-[B-CH_2CH(OH)CH_2-O-(CH_2)_3-Si(R^3)(R^4)-O-[Si(R^1)(R^2)-O]_n-Si(R^5)(R^6)-(CH_2)_3-O-CH_2CH(OH)CH_2-B]_m-L-X,$$

wherein n is from 1-20; m is from 1 to 1,000,000;
$R^1$, $R^2$, $R^3$, $R^4$, $R^5$, and $R^6$ are each independently $C_{1-3}$ alkyl;
B is $-NH-CH(CH_3)(CH_2)-O-(CH_2CH_2-O)_p-(CH_2)(CH_3)CH-NH-$, wherein p is an integer from 2 to 40;
L is selected from $C_1$-$C_{12}$ alkylene, $-CH_2CH(OH)CH_2-$; and
X is selected from $-CO_2H$, $-CO_2M$, $-SO_3H$, $-SO_3M$, and $-NH_4T$, wherein M is a countercation and T is a counteranion.

2. The polyorganosiloxane compound of claim 1, wherein m is 1 and $R^1$, $R^2$, $R^3$, $R^4$, $R^5$, and $R^6$ are $-CH_3$.

3. The polyorganosiloxane compound of claim 2, wherein L is $-CH_2CH(OH)CH_2-$.

4. The polyorganosiloxane compound of claim 2, wherein L is $C_1$-$C_{12}$ alkylene.

5. The polyorganosiloxane compound of claim 2, wherein X is $-CO_2H$ and/or $-CO_2M$; and M is $Na^+$ and/or $K^+$.

6. The polyorganosiloxane compound of claim 2, wherein X is $-SO_3H$ and/or $-SO_3M$; and M is $Na^+$ and/or $K^+$.

7. The polyorganosiloxane compound of claim 2, wherein X is $-SO_3M$; M is $Na^+$; and L is $-CH_2CH(OH)CH_2-$.

8. The polyorganosiloxane compound of claim 2, wherein p is an integer from 10 to 20.

9. A firefighting foam composition comprising the polyorganosiloxane compound according to claim 1.

10. The firefighting foam composition of claim 9, further comprising one or more surfactants selected from non-ionic surfactants, zwitterionic surfactants, anionic surfactants, and combinations thereof.

11. The firefighting foam composition of claim 10, wherein the one or more surfactants are selected from the group consisting of alkylglycosides, alkyl polyglycosides, alkyl sulfobetaines, alkyl sulfates, and combinations thereof.

12. The firefighting foam composition of claim 9, further comprising one or more solvents selected from the group consisting of hexylene glycol, butyl carbitol, butyl cellulose, polyethylene glycol, methyl diproxitol, propylene glycol, propylene glycol n-propyl ether and tripropylene glycol methyl ether; and/or one or more foam stabilizers selected from the group consisting of ethylene glycol monoalkyl ethers, polyethylene glycol, diethylene glycol monoalkyl ethers, propylene glycol, dipropylene monoalkyl ethers, triethylene glycol monoalkyl ethers, 1-butoxyethoxy-2-propanol, glycerine, hexylene glycol, and trimethylglycine.

13. The firefighting foam composition of claim 9, wherein the firefighting foam composition is substantially free of fluorinated surfactants.

14. A method of forming a firefighting foam, comprising:

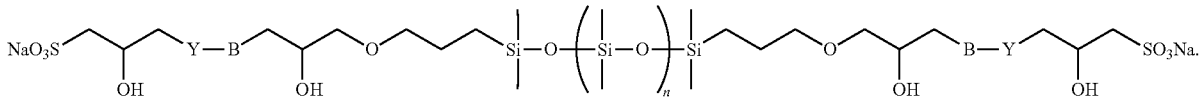

mixing the firefighting foam composition of claim 9 with water to form a use strength solution; and
aerating the use strength solution to form the firefighting foam.

15. A method of fighting a fire comprising administering the firefighting foam of claim 14 to the fire.

16. A method of making the polyorganosiloxane compound of claim 1 comprising:
(a) forming a first reaction mixture comprising a diglycidyl ether terminated polyorganosiloxane having a formula

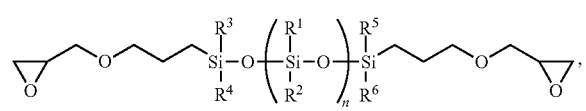

wherein n is an integer from 1 to 20; and
a first reactant $CH_3CH(NH_2)CH_2$—O—$(CH_2CH_2$—O)$_P$—$CH_2CH(NH_2)CH_3$; and
(b) adding a second reactant $ZCH_2CH(OH)CH_2X$ to the first reaction mixture, wherein Z is a leaving group selected from $Cl^-$, $Br^-$, and/or $I^-$; X is —$CO_2M$ and/or —$SO_3M$; and M is $Na^+$ and/or $K^+$.

17. A polyorganosiloxane compound having a Formula:

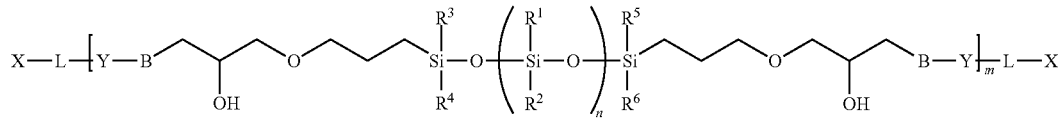

wherein n is an integer from 1 to 20; m is from 1 to 1,000; $R^1$, $R^2$, $R^3$, $R^4$, $R^5$, and $R^6$ are each independently $C_{1-3}$ alkyl;
B is selected from a secondary amine and a tertiary amine;
Y is a linear or branched polyethylenimine;
L is selected from $C_1$-$C_{12}$ alkylene and —$CH_2CH(OH)CH_2$—; and
X is selected from —$CO_2H$, —$CO_2M$, —$SO_3H$, —$SO_3M$, and —$NH_4T$, wherein M is a countercation and T is a counteranion.

18. The polyorganosiloxane compound according to claim 17, wherein the polyethylenimine comprises a molecular weight of from about 1,000 to about 10,000.

19. The polyorganosiloxane compound according to claim 17, wherein the polyethylenimine has a number average molecular weight selected from of about 1,000 g/mol to 10,000 g/mol.

20. The polyorganosiloxane compound of claim 17, wherein X is —$SO_3M$, M is $Na^+$; and L is —$CH_2CH(OH)CH_2$—.

21. The polyorganosiloxane compound of claim 20 having a Formula:

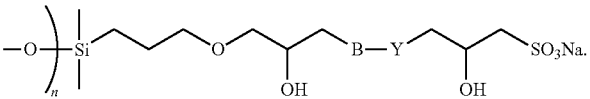

22. A firefighting foam composition comprising the polyorganosiloxane compound according to claim 17.

23. The firefighting foam composition according to claim 22, further comprising one or more surfactants selected from non-ionic surfactants, zwitterionic surfactants, anionic surfactants, and combinations thereof.

24. The firefighting foam composition of claim 22, further comprising one or more solvents, one or more electrolytes, one or more foam stabilizers, one or more film formers, one or more corrosion inhibitors, and/or one or more antimicrobials.

25. A firefighting foam comprising water and the firefighting foam composition of claim 22.

26. A method of fighting a fire comprising administering the firefighting foam of claim 25 to the fire.

27. The polyorganosiloxane compound according to claim 17, wherein X is selected from —$CO_2H$ and —$CO_2M$.

28. The polyorganosiloxane compound according to claim 17, wherein X is selected from —$SO_3H$ and —$SO_3M$.

29. The polyorganosiloxane compound according to claim 17, wherein the polyorganosiloxane compound is produced by reacting a diglycidyl ether terminated polyorganosiloxane having a formula:

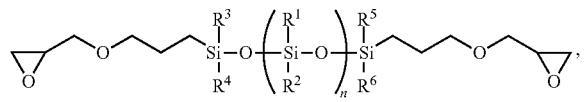

wherein n is an integer from 1 to 20;

with a branched polyethyleneimine reactant; and a second reactant ZCH$_2$CH(OH)CH$_2$X, wherein Z is a leaving group selected from Cl$^-$, Br$^-$, and I$^-$; X is selected from —CO$_2$H, —CO$_2$M, —SO$_3$H, and —SO$_3$M; and M is a countercation.

30. The polyorganosiloxane compound according to claim 29, wherein the branched polyethyleneimine reactant has a formula:

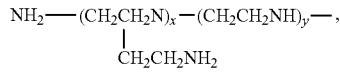

and a number average molecular weight of about 1,000 g/mol to 10,000 g/mol.

31. The polyorganosiloxane compound according to claim 29, wherein the branched polyethyleneimine reactant has a formula:

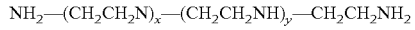

wherein y and x are each an integer greater than 1, and a ratio of y to x is about 1:5 to about 5:1.

32. A method of making the polyorganosiloxane compound according to claim 17 comprising (a) adding first reactant to a reaction mixture comprising a diglycidyl ether terminated polyorganosiloxane having a formula:

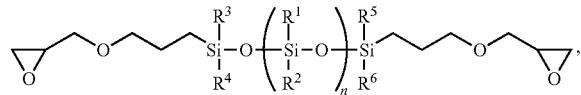

wherein n is an integer from 1 to 20; and the first reactant is a linear and/or branched polyethyleneimine; and (b) adding a second reactant ZCH$_2$CH(OH)CH$_2$X to the reaction mixture, wherein Z is a leaving group selected from Cr$^-$, Br$^-$, and I$^-$; X is selected from —CO$_2$H, —CO$_2$M, —SO$_3$H, and —SO$_3$M; and M is a countercation.

33. The method of claim 32, wherein the polyethylenimine has a formula:

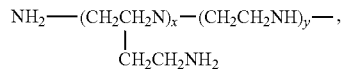

wherein y and x are each an integer greater than 1.

34. The method of claim 33, wherein a ratio of y to x is about 1:5 to about 5:1.

35. The method of claim 32, wherein the polyethylenimine has a number average molecular weight of about 1,000 g/mol to 10,000 g/mol.

36. The method of claim 32, wherein the second reactant ZCH$_2$CH(OH)CH$_2$X is a sodium salt of 3-chloro-2-hydroxy-propane sulfonic acid.

37. The polyorganosiloxane compound according to claim 17, wherein the polyethylenimine comprises about 25% tertiary amine.

38. The polyorganosiloxane compound according to claim 17, wherein the polyethylenimine comprises about 50% secondary amine.

39. The polyorganosiloxane compound according to claim 17, wherein the polyethylenimine comprises about 25% primary amine.

* * * * *